(12) United States Patent
Aburakawa et al.

(10) Patent No.: US 7,116,909 B2
(45) Date of Patent: Oct. 3, 2006

(54) INFORMATION TRANSMISSION SYSTEM AND INFORMATION TRANSMISSION METHOD, AND, OPTICAL SPACE TRANSMISSION SYSTEM AND OPTICAL SPACE TRANSMISSION METHOD

(75) Inventors: Yuji Aburakawa, Yokohama (JP); Hitoshi Yoshino, Yokosuka (JP); Toru Otsu, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 686 days.

(21) Appl. No.: 09/988,555

(22) Filed: Nov. 20, 2001

(65) Prior Publication Data
US 2002/0109885 A1    Aug. 15, 2002

(30) Foreign Application Priority Data
Feb. 15, 2001  (JP) .............................. 2001-039178

(51) Int. Cl.
*H04B 10/00*    (2006.01)
(52) U.S. Cl. .................................................... 398/115
(58) Field of Classification Search ........ 398/115–117, 398/5, 74
See application file for complete search history.

(56) References Cited

U.S. PATENT DOCUMENTS

| | | | |
|---|---|---|---|
| 5,264,955 A | 11/1993 | Sakanaka et al. | |
| 5,404,572 A | 4/1995 | Ishii | |
| 5,659,883 A * | 8/1997 | Walker et al. ................. | 455/59 |
| 5,748,623 A | 5/1998 | Sawahashi et al. | |
| 5,844,705 A | 12/1998 | Rutledge | |
| 6,366,375 B1 | 4/2002 | Sakai et al. | |
| 6,763,195 B1 * | 7/2004 | Willebrand et al. ......... | 398/115 |

FOREIGN PATENT DOCUMENTS

| | | |
|---|---|---|
| CN | 1115195 | 7/1996 |
| CN | 1190828 | 8/1998 |
| CN | 1451210 | 10/2003 |
| DE | 44 33 896 | 11/1995 |
| EP | 0 338 765 | 10/1989 |
| EP | 0 513 993 | 11/1992 |
| JP | 1-151328 | 6/1989 |
| JP | 6-77350 | 10/1994 |
| JP | 10-107685 | 4/1998 |
| JP | 10-285114 | 10/1998 |
| JP | EP 11 196069 | 7/1999 |
| JP | 11-220441 | 8/1999 |
| JP | 2000-295181 | 10/2000 |
| JP | 2000-357997 | 12/2000 |
| KR | 1996-27492 | 7/1996 |
| KR | 20-0180276 | 5/2000 |
| KR | 10-0350470 | 8/2002 |
| WO | WO 95/20845 | 8/1995 |
| WO | WO 01/35551 | 5/2001 |
| WO | WO 01/52450 | 7/2001 |

\* cited by examiner

*Primary Examiner*—Shi K. Li
(74) *Attorney, Agent, or Firm*—Oblon, Spivak, McClelland, Maier & Neustadt, P.C.

(57) ABSTRACT

An information transmission system for transmitting information from a sending apparatus to a receiving apparatus is provided. The information transmission system includes: a sending apparatus for modulating an information signal, generating a plurality of signals including an optical signal from the information signal which is modulated, and transmitting the plurality of signals via a plurality of routes; and a receiving apparatus for receiving the plurality of signals from the sending apparatus, diversity-combining the plurality of signals, and outputting the information signal, in which the plurality of signals are a plurality of optical signals or signals including a radio signal.

8 Claims, 30 Drawing Sheets

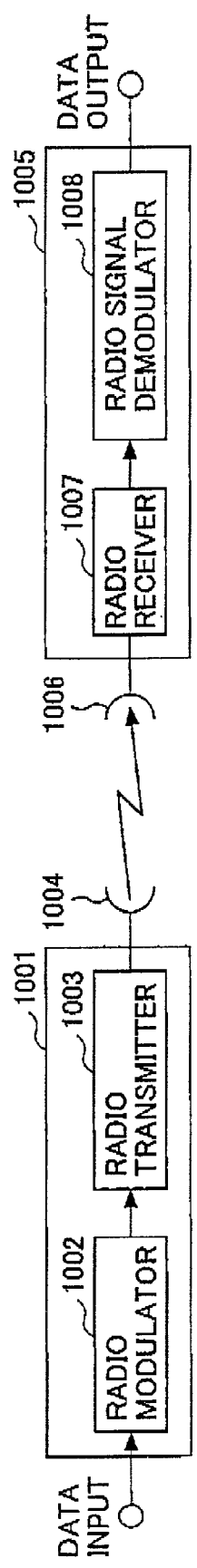
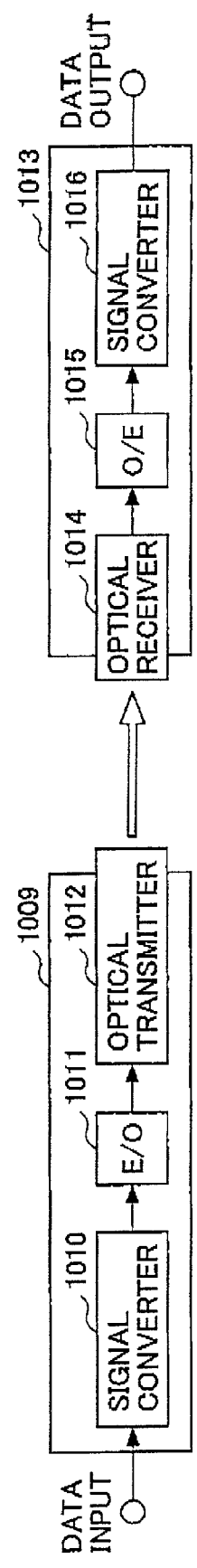

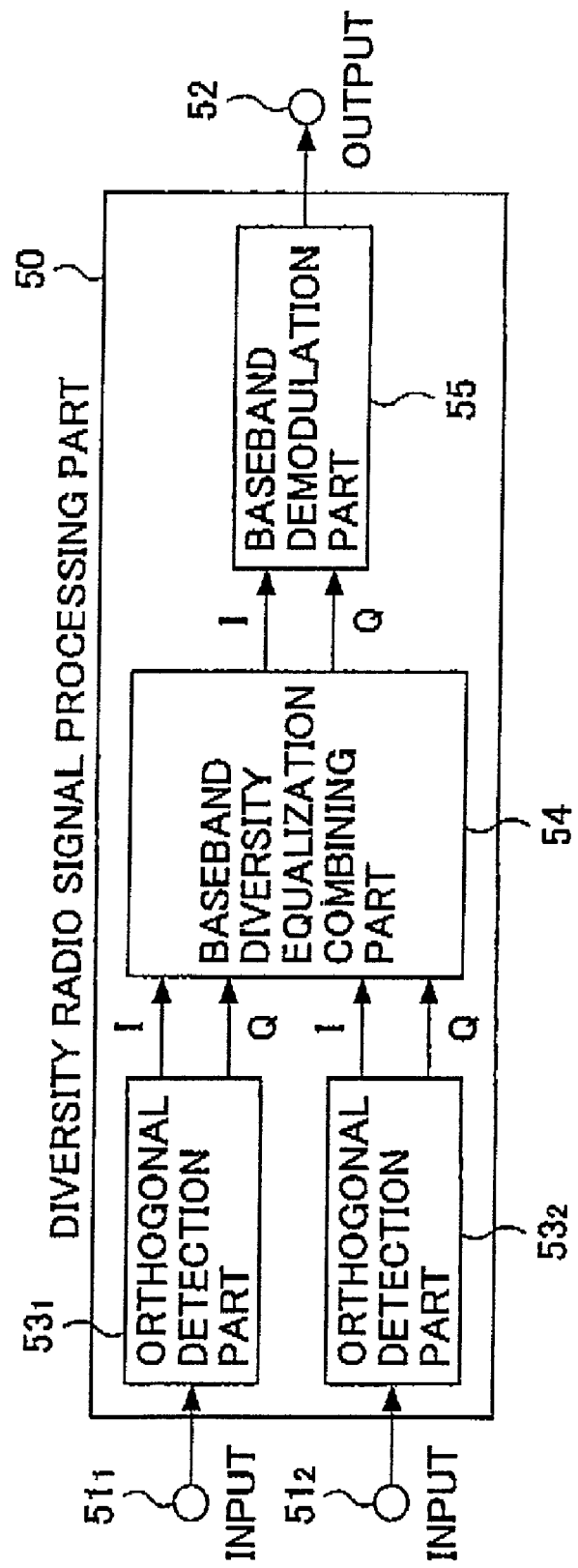

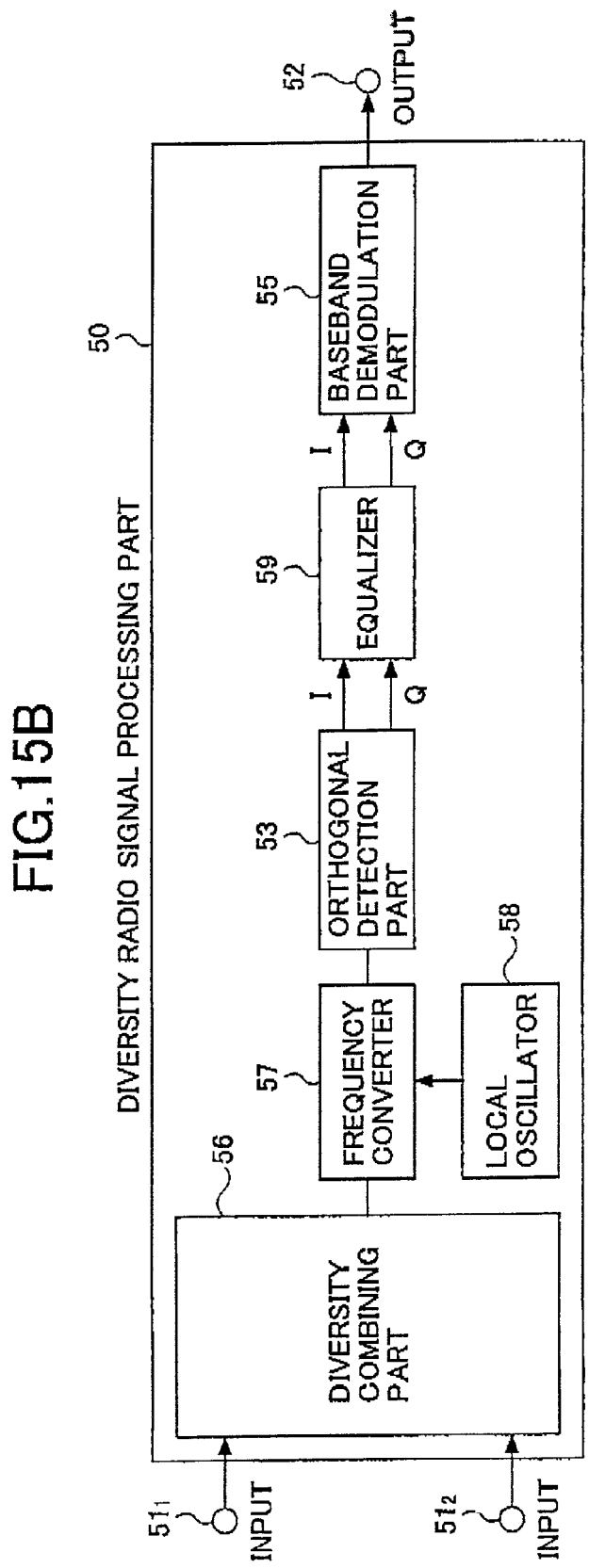

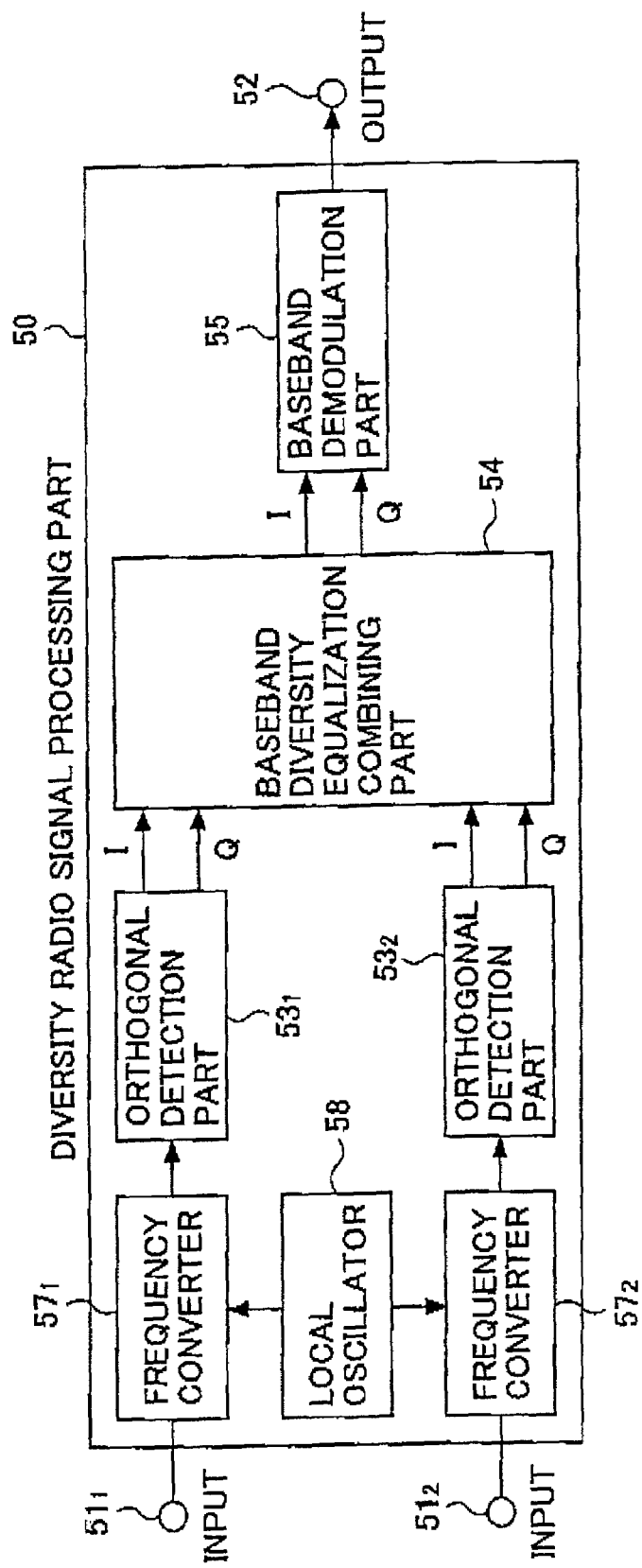

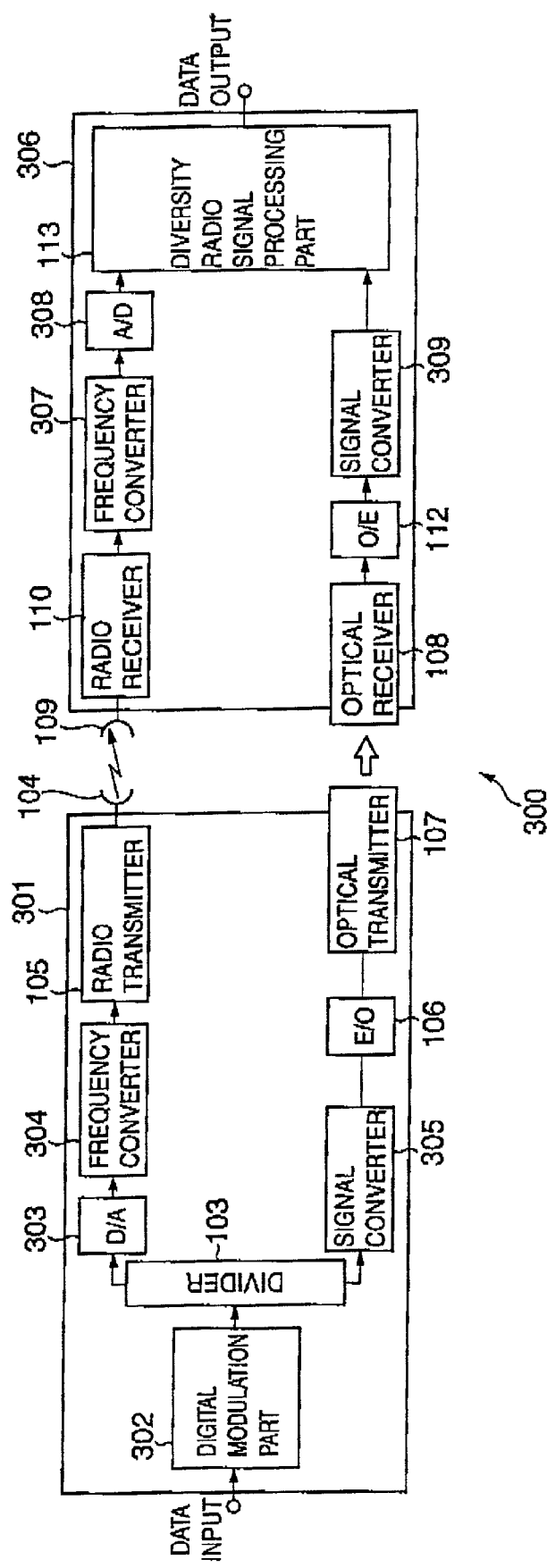

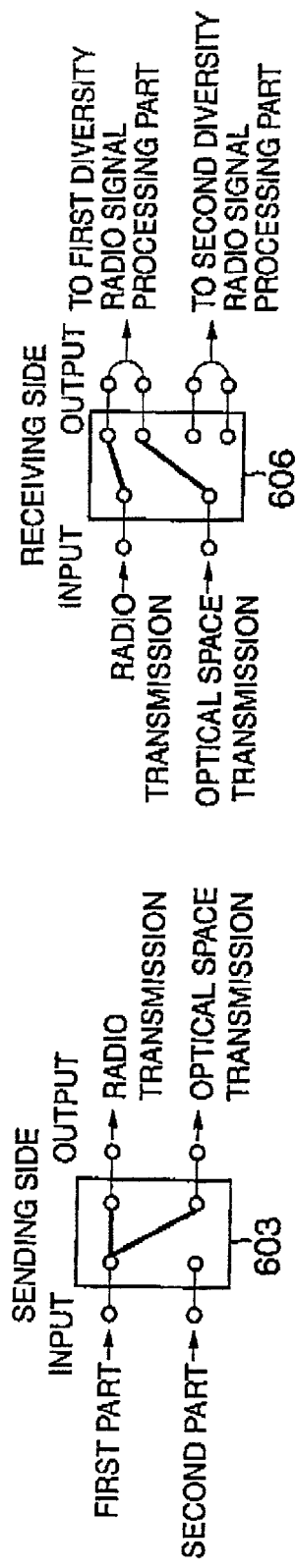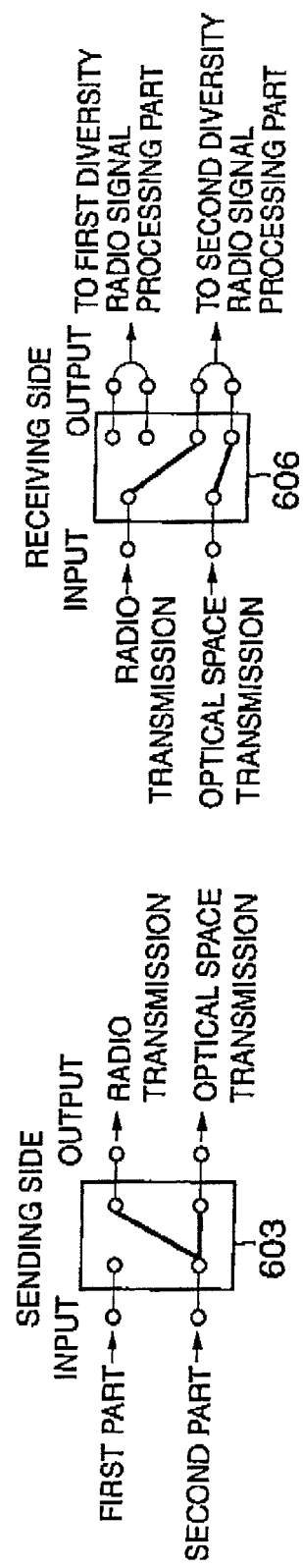

INFORMATION TRANSMISSION SYSTEM AND INFORMATION TRANSMISSION METHOD, AND, OPTICAL SPACE TRANSMISSION SYSTEM AND OPTICAL SPACE TRANSMISSION METHOD

BACKGROUND OF THE INVENTION

1. Field of the Invention

The present invention relates to an information transmission method and the system. More particularly, the present invention relates to an information transmission method and the system tolerant of both of rain and fog. In addition, the present invention relates to an optical space transmission system and the method in which degradation of transmission quality and circuit disconnection are decreased.

2. Description of the Related Art

First, conventional technologies of a first aspect will be described.

FIGS. 1A and 1B show block diagrams showing conventional optical space transmission apparatuses.

As for FIG. 1A, in a sending station 1, a signal to be transmitted is input from an input terminal 3. Then, the signal is converted to a signal format for optical transmission by a signal converter 5. The optical transmitter 6 sends the optical signal to the air. The optical signal is received by an optical receiver 7 in a receiving station 2 and converted to an electrical signal. The electrical signal is converted into an information signal by a signal converter 8 and output from an output terminal 4.

As for an example shown in FIG. 1B, in the sending station 1, a signal to be transmitted is input from an input terminal 3. Then, the signal is converted to a signal format for optical transmission by a signal converter 5. The optical transmitter 6 sends the optical signal to the air. The optical signal is received by an aperture enlarged by a receive aperture enlarger 9 in the receiving side 2. Then, the optical signal forms an optical image on a receive aperture surface of an optical receiver so that the optical signal is received by the optical receiver 7. The optical signal received by the optical receiver 7 is converted to an electrical signal. The electrical signal is converted into an information signal by a signal converter 8 and output from an output terminal 4.

According to the above-mentioned configuration, when the optical signal transmitted from the optical transmitter is sent to the receiving station via the air, intensity of receive light may fluctuates (spot dancing, beam bending, scintillation) in the receiving station since the refractive index of the air changes due to fluctuations of air temperature and humidity so that propagation path of the light beam fluctuates. Thus, there is a problem in that circuit quality degradation or circuit disconnection occurs due to the above-mentioned fluctuations even in good weather.

It is possible that the effect of the fluctuations can be decreased by enlarging the receive aperture as shown in FIG. 1B. However, it is difficult to prepare a large aperture due to lack of image formation technique and limitation of the size of the apparatus. In the configurations shown in FIGS. 1A and 1B, although electrical/optical (E/O) converters and optical/electrical (O/E) converters are provided, they are not shown in the figures.

Next, conventional technologies of a second aspect of the present invention will be described.

Conventionally, a radio transmission and an optical space transmission are performed separately. The conventional information transmission method will be described with reference to FIGS. 2A and 2B. FIG. 2A is a block diagram of a conventional radio transmission system, and FIG. 2B is a block diagram of a conventional optical space transmission system.

In a conventional radio transmission system, data (information signal) is input from an input terminal in a sending station 1001. The signal is converted into a radio signal of radio frequency band by a radio modulator 1002, and sent to the air via a radio transmitter 1003 and an antenna 1004.

In a receiving station 1005, the sent radio signal is received by a radio receiver 1007 via an antenna 1006, and the received signal is demodulated into original data (information signal) by a radio signal demodulator 1008.

On the other hand, according to a conventional optical space transmission system shown in FIG. 2B, data (information signal) is input from an input terminal in a sending station 1009. The signal is converted into a signal format for optical communication by a signal converter 1010. After that, the signal is converted into an optical signal by an electric/optical (E/O) converter 1011 and the optical signal is sent to the air by an optical transmitter 1012.

In a receiving station 1013, the sent optical signal is received by an optical receiver 1014. Then, the signal is converted into an electrical signal by an optical/electrical (O/E) converter 1015. After that, the signal (information signal) is converted into original signal by a signal converter 1016.

Accordingly, since either radio transmission or optical transmission is used for conventional information transmission, the sending station and the receiving station in a radio transmission system only have functions of sending and receiving a radio signal respectively, and the sending station and the receiving station in a optical space transmission system only have functions of sending and receiving an optical signal respectively.

However, for realizing high capacity information transmission by the conventional information transmission system, there is a problem in that keeping reliable availability and long distance transmission are difficult.

That is, for realizing high capacity information transmission in radio transmission, since wide bandwidth becomes necessary, the radio frequency band becomes usually high frequency band (submillimeter wave, millimeter wave). This frequency band is resistant to fog, however, very large propagation loss occurs due to rain in this frequency band. Thus, it is necessary to provide a large margin considering attenuation due to rain.

In addition, as for optical space transmission, it is resistant to rain, however, remarkably large propagation loss occurs due to degradation of visibility by fog. Therefore, it is necessary to provide a large margin considering attenuation by fog.

As mentioned above, the conventional information system in which only one of radio transmission and optical space transmission is performed is not resistant to rain or fog. Thus, it is necessary to provide a margin considering rain or fog so that keeping reliable availability or long distance transmission are difficult.

SUMMARY OF THE INVENTION

It is a first object of the present invention to provide an optical space transmission system, an optical space transmission method and an optical space transmission apparatus which can decrease degradation of transmission quality and circuit disconnection even when the refractive index of the air changes due to fluctuations of temperature and humidity of the air.

It is a second object of the present invention to provide an information transmission system and an information transmission method resistant to both of rain and fog.

The above object is achieved by an information transmission system for transmitting information from a sending apparatus to a receiving apparatus, the information transmission system including:

a sending apparatus for modulating an information signal, generating a plurality of signals including an optical signal from the information signal which is modulated, and transmitting the plurality of signals via a plurality of routes; and a receiving apparatus for receiving the plurality of signals from the sending apparatus, combining the plurality of signals, and outputting the information signal.

In the information transmission system, the plurality of signals are a plurality of optical signals or signals including a radio signal.

According to the invention, since the information signal is modulated and can be transmitted by an optical signal, signal processing technology such as equalization, diversity combining which are used in radio communication can be applied. Thus, degradation of transmission quality and circuit disconnection can be decreased, and high quality transmission can be performed even when the refractive index of the air changes due to fluctuations of temperature and humidity of the air. Further, since transmission by both of an optical signal and an radio signal can be performed, an information transmission system resistant to both of rain and fog can be provided.

The above object is also achieved by an optical space transmission system in which a sending side (a first optical space transmission apparatus) converts an information signal into a radio modulation signal and sends the radio modulation signal as an optical signal, and a receiving side (a second optical space transmission apparatus) receives the optical signal by a plurality of optical receivers which converts the outputs into electrical signals and performs diversity combining for the electrical signals.

Accordingly, by receiving the transmitted optical signal by a plurality of optical receivers, a plurality of optical signals having relatively low correlation can be obtained via almost independent optical paths. In addition, by sending the information signal after converting into a radio modulation signal, radio signal processing can be applied for baseband processing in the optical transmitters and optical receivers. Thus, receive quality can be improved by diversity processing and equalization.

In addition, transmission capacity can be enlarged by multilevel modulation and the like.

The sending side converts an information signal to be sent into a radio modulation signal, divides the output into a plurality of branches, and converts signals of the branches into optical signals and transmits said optical signals to the air. Or, the sending side divides the information signal into a plurality of branches, converts the signals of the branches into radio modulation signals which are sent to the air as optical signals. The receiving side receives the optical signals together and converts the optical signals into electrical signals, and equalizes and combines the electrical signals.

Accordingly, by sending signals from a plurality of optical transmitters, receiving the signals together by one optical receiver, and equalizing and combining the output, diversity combining effect can be obtained for a plurality of optical signals having relatively low correlation via almost independent optical paths. In addition, since the information signal is sent after converting into a radio modulation signal, high quality diversity effect can be obtained by performing equalization and combining as radio signal processing.

In addition, a configuration including a plurality of optical transmitters and a plurality of optical receivers can be realized in addition to a configuration including one optical transmitter and a plurality of optical receivers, and a configuration including a plurality of optical transmitters and one optical receiver. Thus, transmission quality can be further improved.

In addition, one or more delay circuits can be provided for delaying a part of signals in the branches can be delayed and transmitted to the air. In the receiving side, the transmitted signals are received together, converted into electrical signals, equalized and combined. As a result, time diversity reception can be realized.

Accordingly, degradation of transmission quality due to effect of fluctuating path according to time can be dispersed with respect to time so that transmission quality can be improved.

In addition, the sending side converts an information signal to be sent into a radio modulation signal, divides the radio modulation signal into a plurality of branches, delays a signal of a branch, multiplexes the delayed signal with another signal, and sends the multiplexed signal as an optical signal. The receiving side receives the optical signal and converts the optical signal into an electrical signal and equalizes and combines the electrical signal so that time diversity reception can be realized.

Accordingly, degradation of transmission quality due to effect of fluctuating path according to time can be dispersed with respect to time so that transmission quality can be improved.

In the above-configuration, the radio signal modulation part may include a baseband modulation part, and a orthogonal modulation part which orthogonally modulates output of the baseband modulation part. As a result, the baseband radio modulation signal can be transmitted as an optical signal. The radio signal modulation part may convert the output of the orthogonal modulation part into intermediate frequency band signal or radio frequency band signal. Then, the signal is converted to an optical signal and transmitted.

The radio signal processing part in the receiving side may include an orthogonal detection part which detects baseband radio modulation signals, an equalizer which equalizes output of the orthogonal detection part, and a baseband demodulation part which converts output of the equalizer into an original information signal.

In addition, the radio signal processing part may include a frequency converter which converts a radio modulation signal of intermediate frequency band or radio frequency band, an orthogonal detection part which detects the baseband signal output from the frequency converter, an equalizer which equalizes output of the orthogonal detection part, and a baseband demodulation part which converts output of the equalizer into an original information signal.

Accordingly, when receiving optical signals sent from a plurality of optical transmitters, the signals can be equalized and combined by using the equalizer.

The diversity radio signal processing part may include a plurality of orthogonal detection parts which detect baseband signals received by the optical receivers, and a baseband diversity equalization combining part which combines outputs of the orthogonal detection parts.

The diversity radio signal processing part may include a diversity combining part which combines signals of intermediate frequency band or radio frequency band received by the optical receivers, a frequency converter for output of said diversity combining part, an orthogonal detection part which detects a baseband radio modulation signal output from the frequency converter, an equalizer which equalizes and combines output of the orthogonal detection part, and a baseband demodulation part which converts output of the equalizer into an original information signal.

In addition, the diversity radio signal processing part may include a plurality of frequency converters which performs frequency conversion for signals of intermediate frequency band or radio frequency band received by the optical receivers, and a baseband diversity equalization combining part.

The diversity combining part for the intermediate frequency band or the radio frequency band may include a part for maximum ratio combining, selection combining or equal gain combining. The baseband diversity equalization combining part equalizes a plurality of baseband signals, and performs the maximum ratio combining, the selection combining or the equal gain combining. Or, the baseband diversity equalization combining part may include adaptive decision feedback type transversal combining diversity. The adaptive decision feedback type transversal combining diversity may use an adaptive algorithm for determining tap coefficient of the transversal equalizer. The adaptive algorithm may be the RLS algorithm, LMS algorithm and the like.

The above-object is also achieved by an information transmission method used for transmitting information from a sending apparatus to a receiving apparatus, the information transmission method including the steps of:

the sending apparatus modulating an information signal, transmitting the information signal which is modulated to the receiving apparatus via a plurality of routes as a radio signal and an optical signal;

the receiving apparatus receiving the radio signal transmitted from the sending apparatus and outputting a first signal, and receiving the optical signal transmitted from the sending apparatus and outputting a second signal; and the receiving apparatus combining the first signal and the second signal, and regenerating the information signal.

According to the invention, since the information signal is transmitted by two systems for the radio signal and the optical signal and the signals are diversity-combined in the receiving station, even when one of signals in the two systems is largely attenuated due to rain or fog, other signal is not largely attenuated. Therefore, resistance to both of rain and fog can be improved. In addition, even when the signals of the two systems are attenuated by rain and fog, communication quality can be improved by diversity-combining the signals.

The information transmission method may further includes the steps of:

the sending apparatus dividing the information signal into a first signal part and a second signal part;

wherein the sending apparatus transmits the first signal part to the receiving apparatus as a radio signal, and transmits the second signal part to the receiving apparatus as an optical signal.

According to the invention, transmission capacity can be doubled by transmitting different signals by a radio transmission route and an optical space transmission route.

The above-object is also achieved by an information transmission method used for transmitting information from a sending apparatus to a receiving apparatus, the information transmission method including the steps of:

selecting one of a first transmission mode and a second transmission mode, the sending apparatus dividing an information signal into a first signal part and a second signal part, modulating the first signal part and the second signal part;

controlling the sending apparatus such that the first signal part is transmitted to the receiving apparatus as a radio signal and the second signal part is transmitted to the receiving apparatus as an optical signal when the first transmission mode is selected;

controlling the sending apparatus such that the information signal is transmitted to the receiving apparatus via a plurality of routes including a radio transmission route and an optical transmission route when the second transmission mode is selected;

the receiving apparatus multiplexing the first signal part and the second signal part when the first transmission mode is selected; and the receiving apparatus diversity-combining the information signal which is transmitted via the plurality of routes when the second transmission mode is selected.

According to the invention, a first transmission mode in which transmission capacity is doubled and a second transmission mode in which communication quality is maintained can be used selectively.

In the information transmission method, the first transmission mode may be selected when transmission routes between the sending apparatus and the receiving apparatus are in a first condition, and the second transmission mode may be selected when the transmission routes between the sending apparatus and the receiving apparatus are in a second condition which is worse than the first condition.

In this method, the condition of the transmission routes is, for example, magnitude of propagation loss (or atmospheric attenuation) in the transmission routes. The loss can be judged by receive level of the receiving station for example. A condition in which propagation loss is relatively small can be called a first state, and a condition in which propagation loss is relatively large can be called a second state.

According to the invention, when the condition is good, transmission capacity can be doubled by transmitting different signals by a radio transmission route and an optical space transmission route. When the condition is not good, communication quality can be maintained by transmuting the information signal via the two routes which are the radio transmission route and the optical space transmission route.

The above-object is also achieved by a sending apparatus including:

a radio signal modulation part for modulating an information signal;

a radio signal transmitter for transmitting the information signal which is modulated as a radio signal; and an optical signal transmitter for transmitting the information signal which is modulated as an optical signal.

According to the invention, since the information signal is transmitted by two systems for the radio signal and the optical signal and the signals are diversity-combined in the receiving station, even when one of signals in the two systems is largely attenuated due to rain or fog, other signal is not largely attenuated. Therefore, resistance to both of rain and fog can be improved.

The sending apparatus may further includes:

a signal conversion part for converting the information signal which is modulated to a radio signal of an intermediate frequency band;

a frequency conversion part for converting frequency band of the radio signal to a radio frequency band;

an optical signal conversion part for converting the radio signal of the intermediate frequency band to an optical signal.

According to the invention, since a signal to be applied to the electrical/optical converter becomes a radio signal of intermediate frequency band, it becomes unnecessary to use a device applicable to high frequency band in which operating frequency characteristic is radio frequency band as the electrical/optical converter. Thus, cost performance can be improved.

The sending apparatus may further includes:

a digital signal conversion part for converting the information signal to a digital signal;

an analog signal converter for converting the digital signal into a radio signal of an analog signal format; and an optical signal conversion part for converting the digital signal to an optical signal.

According to the invention, transmission power can be decreased by using digital transmission in the optical space transmission section. Thus, apparatuses can be simpler and cost performance can be improved.

The sending apparatus may further includes:

a signal dividing part for dividing the information signal into a first signal part and a second signal part;

wherein the radio signal transmitter transmits the first signal part as a radio signal, and the optical signal transmitter transmits the second signal part as an optical signal.

The above-object is also achieved by a sending apparatus including:

a mode selection part for selecting one of a first transmission mode and a second transmission mode, a signal dividing part for dividing an information signal into a first signal part and a second signal part;

radio signal modulation parts for modulating the first signal part and the second signal part;

a control part for controlling the sending apparatus such that the first signal part is transmitted as a radio signal and the second signal part is transmitted as an optical signal when the first transmission mode is selected;

the control part controlling the sending apparatus such that the information signal is transmitted via a plurality of routes including a radio transmission route and an optical transmission route when the second transmission mode is selected.

In the sending apparatus, the mode selection part may select the first transmission mode when transmission routes between the sending apparatus and a receiving apparatus at the other end are in a first condition, and the mode selection part may select the second transmission mode when the transmission routes are in a second condition which is worse than the first condition.

The above-object is also achieved by a receiving apparatus including:

a radio signal receiver for receiving a radio signal transmitted and outputting a first signal;

an optical signal receiver for receiving an optical signal and outputting a second signal; and a signal combining part for combining the first signal and the second signal, and regenerating the information signal.

The receiving apparatus may further includes:

a mode selection part for selecting one of a first transmission mode and a second transmission mode;

wherein the first signal and the second signal are multiplexed when the first transmission mode is selected, and the first signal and the second signal are diversity-combined by the signal combining part when the second transmission mode is selected.

In the receiving apparatus, the mode selection part may select the first transmission mode when transmission routes between the sending apparatus and the receiving apparatus are in a first condition, and the mode selection part may select the second transmission mode when the transmission routes between the sending apparatus and the receiving apparatus are in a second condition which is worse than the first condition.

By using the sending apparatus and the receiving apparatus, the information transmission system can be provided, and the above-mentioned effects can be obtained.

BRIEF DESCRIPTION OF THE DRAWINGS

Other objects, features and advantages of the present invention will become more apparent from the following detailed description when read in conjunction with the accompanying drawings, in which:

FIG. 2A is a block diagram of a conventional radio transmission system, and FIG. 2B is a block diagram of a conventional optical space transmission system;

FIGS. 15A–15C are block diagrams showing diversity radio signal processing parts;

FIG. 21 is a block diagram of the information transmission system of an example 2-3 of the second embodiment of the present invention;

FIGS. 26A and 26B are schematic diagrams showing switching states of the distribution switches 603 and 606 when propagation loss in the propagation route is relatively large.

DETAILED DESCRIPTION OF THE PREFERRED EMBODIMENTS

Figure 1A:
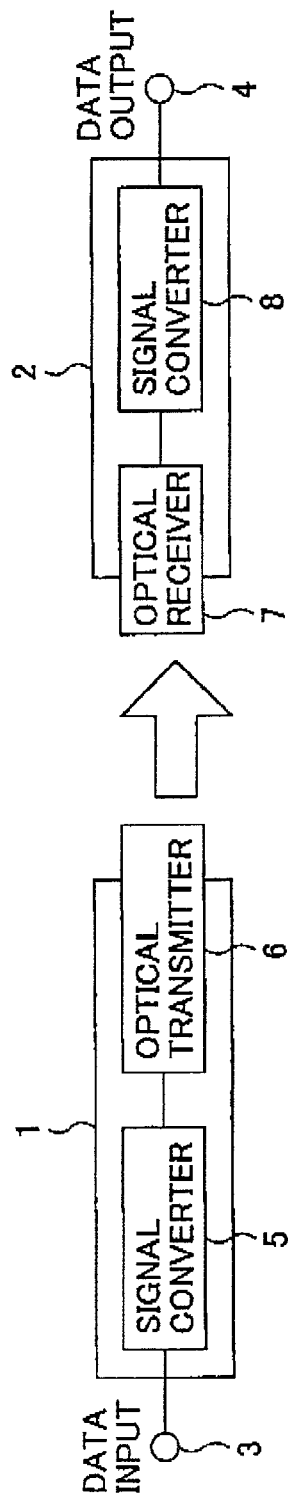
FIGS. 1A and 1B is block diagrams showing conventional optical space transmission apparatuses.
Figure 1B:
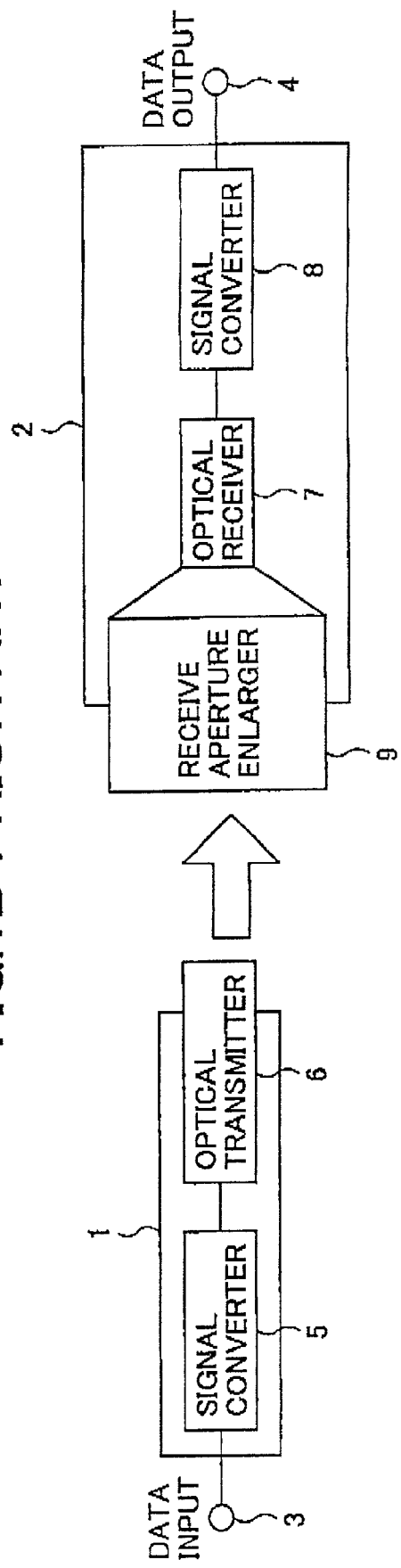

In the following, embodiments of the present invention will be described with reference to figures. In the present invention, a sending station sends a plurality of signals including an optical signal, and a receiving station performs signal processing such as diversity combining processing, so that high quality signal transmission becomes available. In the following, an embodiment in which only optical signals are transmitted will be described as a first embodiment, and an embodiment in which an optical signal and a radio signal are transmitted will be described as a second embodiment.

First embodiment

In the following, the first embodiment which relates to the first object of the present invention will be described with reference to figures. In this embodiment, like reference numerals indicate like elements throughout the several views. In this embodiment, electrical/optical (E/O) converters and optical/electrical (O/E) converters are not shown in the figures.

Figure 3:
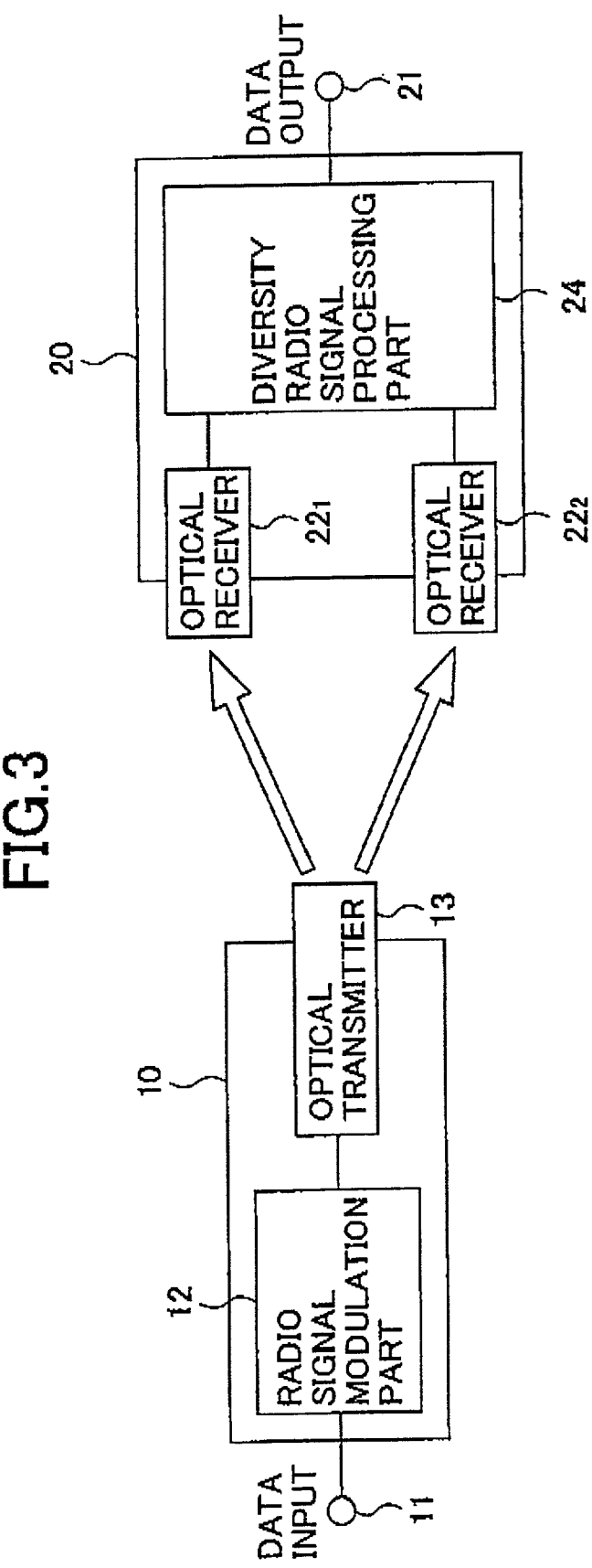
FIG. 3 is a block diagram showing an example of a first embodiment of the present invention in which plurality of optical receivers are provided in the receiving station.
Figure 4:
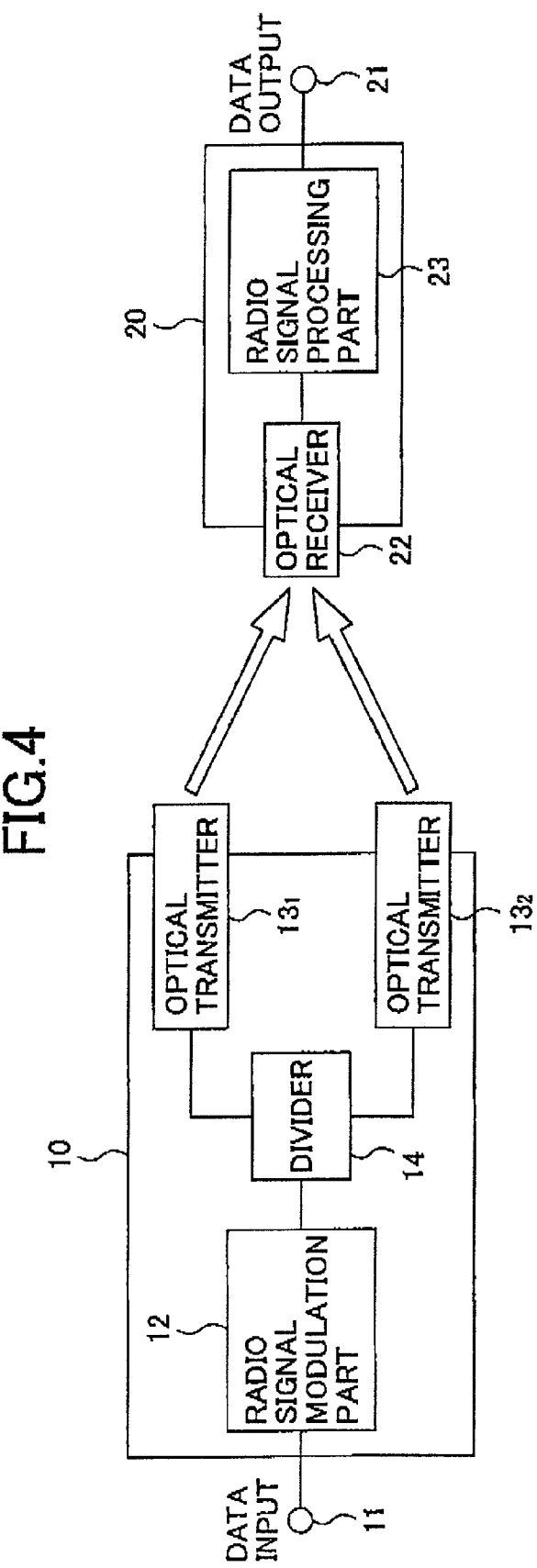
FIG. 4 is a block diagram showing an example of the first embodiment of the present invention in which plurality of optical transmitters are provided in the sending station (1)
Figure 5:
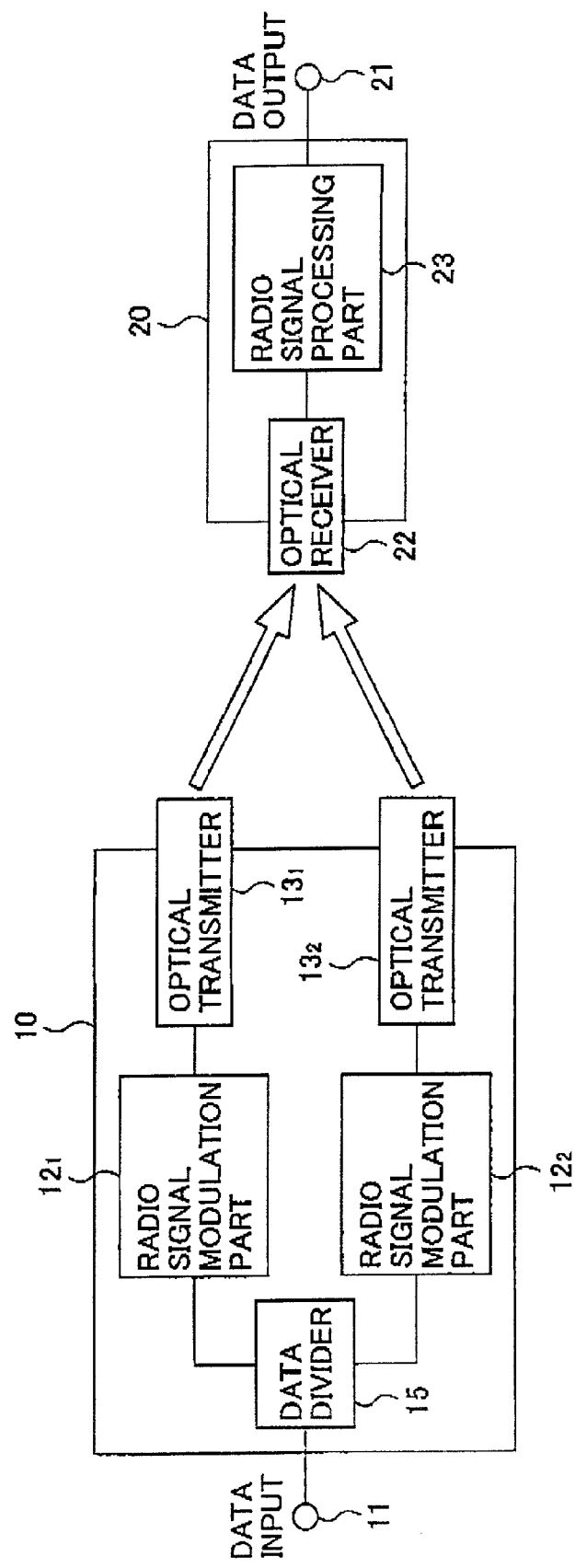
FIG. 5 is a block diagram showing an example of the first embodiment of the present invention in which plurality of optical transmitters are provided in the sending station (2)

FIGS. 3–5 show configurations of the sending station and the receiving station in which a plurality of optical transmitters or a plurality of optical receivers are provided.

In the following examples, two optical transmitters or two optical receivers are provided for an example of a plurality of optical transmitters or a plurality of optical receivers. However, more optical transmitters or more optical receivers can be provided.

In FIG. 3, in a sending station 10, an information signal (data input signal) from an input terminal 11 is converted into a radio modulation signal by a radio signal modulation part 12. The radio modulation signal is converted into an optical signal and transmitted to the air by an optical transmitter 13.

In a receiving station 20, the transmitted optical signal is received by optical receivers $22_1$ and $22_2$. The optical signal is converted into an electrical signal in each of the optical receivers $22_1$ and $22_2$. The outputs from the optical receivers $22_1$ and $22_2$ are diversity-combined and demodulated by the diversity radio signal processing part 24. The demodulated information signal (data output signal) is output from the output terminal 21.

According to this example, the input information signal is converted into the radio modulation signal and transmitted by optical transmission. Thus, it becomes possible to perform signal processing used in radio communication field such as diversity technique and the like. As a result, communication quality can be further improved.

In FIG. 4, in the sending station 10, the information signal from the input terminal 11 is converted into a radio modulation signal by the radio signal modulation part 12. The output is divided into a plurality of routes by a divider 14. (Although the signal is divided into two in the example shown in FIG. 4, the number of division is not limited to two. The present invention can be applied to more than two divisions. The same holds true for the following examples.) Then, each of the divided signals is converted into an optical signal by optical transmitters $13_1$ and $13_2$ and transmitted to the air.

Each of the optical signals transmitted to the air are received by an optical receiver 22 in the receiving station and converted into electrical signals. The electrical signals are equalized, combined and demodulated by a radio signal processing part 23 so that the signals are converted to the original information signal. Then, the converted signal is output from the output terminal 21.

Figure 8:
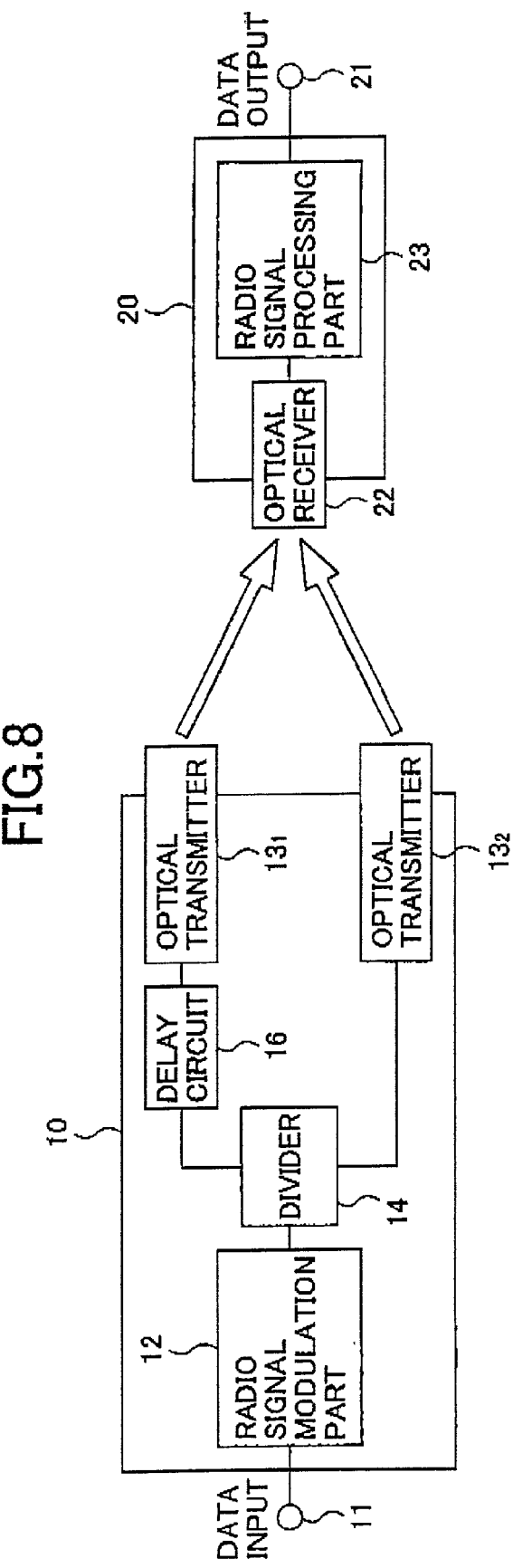
FIG. 8 is a block diagram showing an example of the first embodiment of the present invention in which plurality of optical transmitters are provided and a part of sending signals is delayed (1)

FIG. 8 shows a modification of the configuration shown in FIG. 4. In the configuration shown in FIG. 8, a delay circuit 16 is inserted between one of outputs of the divider 14 and one of the optical transmitters.

As shown in FIG. 8, by delaying the signal output from one of outputs of the divider 14 and optically transmitting the signal, time diversity effect can be obtained in the receiving side. Therefor, transmission quality can be further improved.

The delay circuit can be provided at another output of the divider 14. In addition, when there are a plurality of outputs of the divider, a plurality of delay circuits can be provided at outputs of the divider where delays of each delay circuit may be different.

In FIG. 5, in the sending station 10, an information signal input from the input terminal 11 is divided into a plurality of signals by a divider 15. Each of the divided signals are converted to a radio modulation signal by radio signal modulation parts $12_1$ and $12_2$. Each of the outputs is converted into an optical signal and is transmitted to the air by an optical transmitter $13_1$ or $13_2$.

The transmitted optical signals are received by an optical receiver 22 in the receiving station 20 and converted into electrical signals. The electrical signals are equalized, combined and demodulated so that the electrical signals are converted into the original information signal and output from the output terminal 21.

Figure 9:
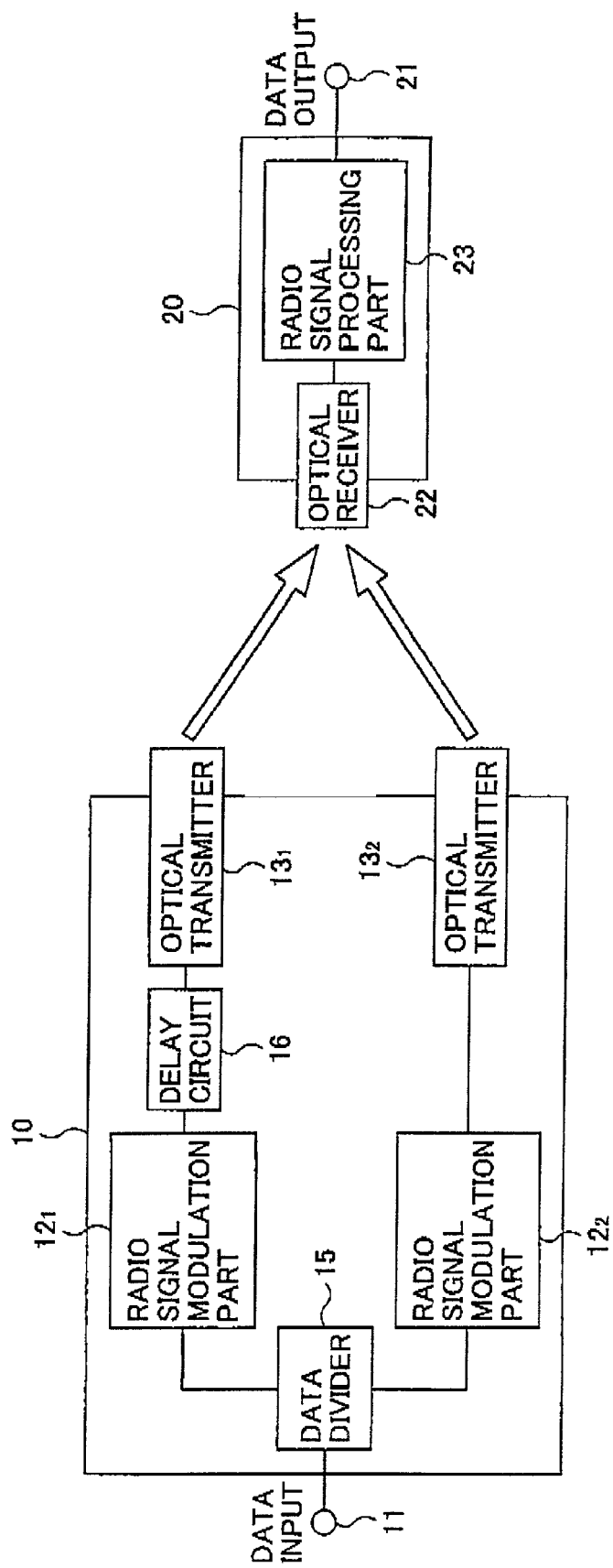
FIG. 9 is a block diagram showing an example of the first embodiment of the present invention in which plurality of optical transmitters are provided and a part of sending signals is delayed (2)

FIG. 9 shows a modification of the configuration shown in FIG. 5. As shown in FIG. 9, a delay circuit 16 is inserted between one of outputs of the radio signal modulation parts $12_1$ and $12_2$ (the radio signal modulation part $12_1$ in the example of FIG. 9) and one of the optical transmitters.

As shown in FIG. 9, by delaying the signal output from the radio signal modulation part $12_1$ and optically transmitting the signal, time diversity effect can be obtained in the receiving side. Therefor, transmission quality can be further improved.

The delay circuit can be provided at another output of the radio signal modulation parts. In addition, when there are more than two divisions, delay circuits which have different delays can be provided at the outputs of the radio signal modulation parts.

Figure 6:
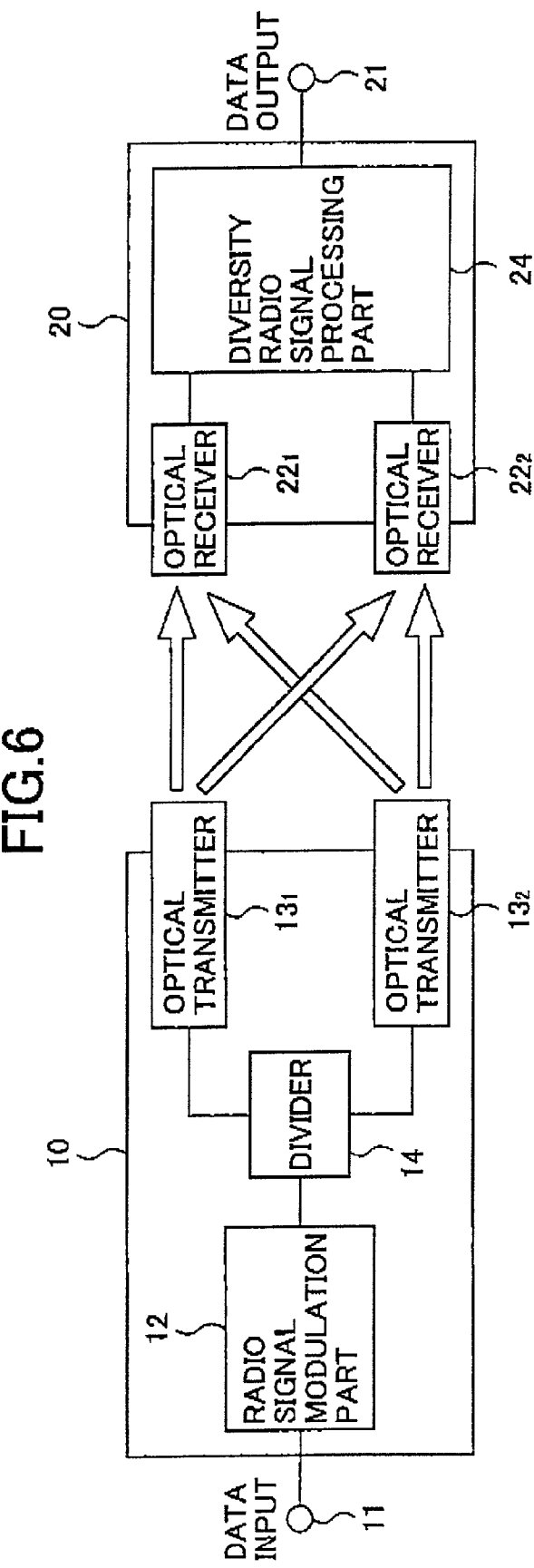
FIG. 6 is a block diagram showing an example of the first embodiment of the present invention in which plurality of optical transmitters and plurality of optical receivers are provided (1)
Figure 7:
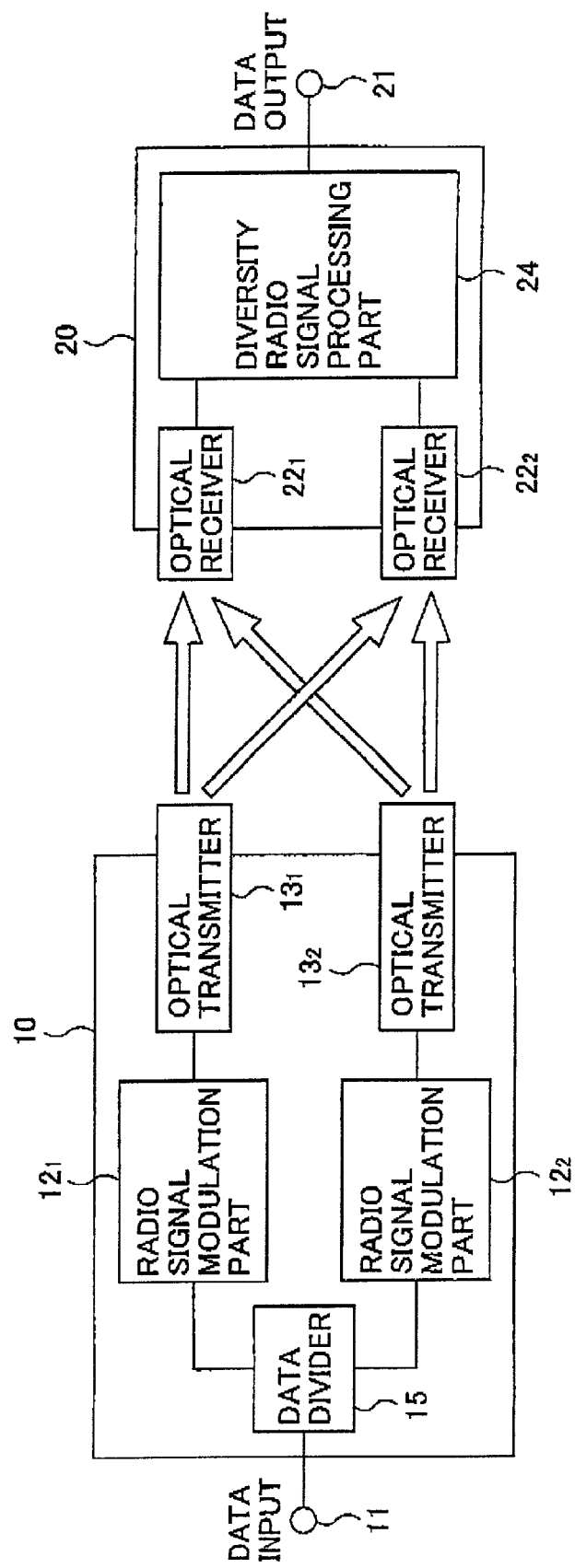
FIG. 7 is a block diagram showing an example of the first embodiment of the present invention in which plurality of optical transmitters and plurality of optical receivers are provided (2)

FIGS. 6 and 7 show configurations in which a plurality of optical transmitters are provided in the sending station and a plurality of optical receivers are provided in the receiving station.

In the sending station shown in FIG. 6, the output of the radio signal modulation part 12 is divided so that optical transmitters $13_1$ and $13_2$ are provided. As for the sending station 10 of FIG. 7, the information signal input from the input terminal 11 is divided into two signals each of which signals is transmitted to the air by the optical transmitter $13_1$ or $13_2$ via the radio signal modulation part $12_1$ or $12_2$.

In the receiving station 20 shown in FIGS. 6 and 7, optical signals received by optical receivers $22_1$ and $22_2$ are converted into electrical signals. The electrical signals are equalized and diversity-combined by a diversity radio signal processing part 24.

Figure 10:
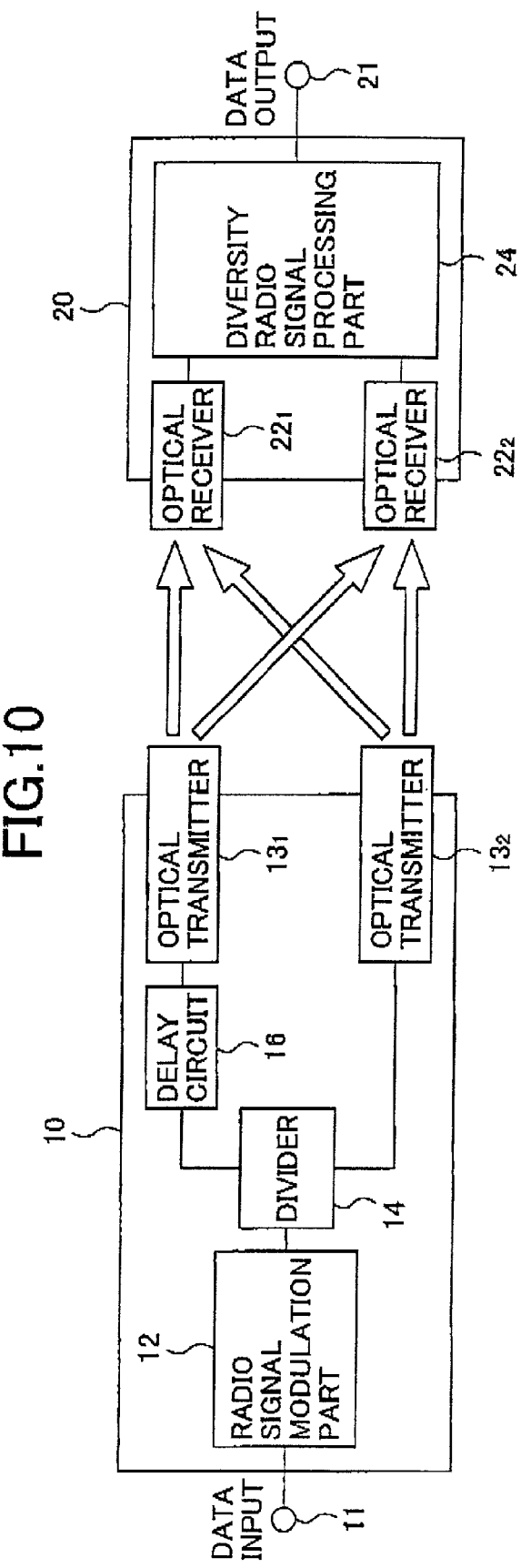
FIG. 10 is a block diagram showing an example of the first embodiment of the present invention in which plurality of optical transmitters and plurality of optical receivers are provided and a part of send signals is delayed (1)
Figure 11:
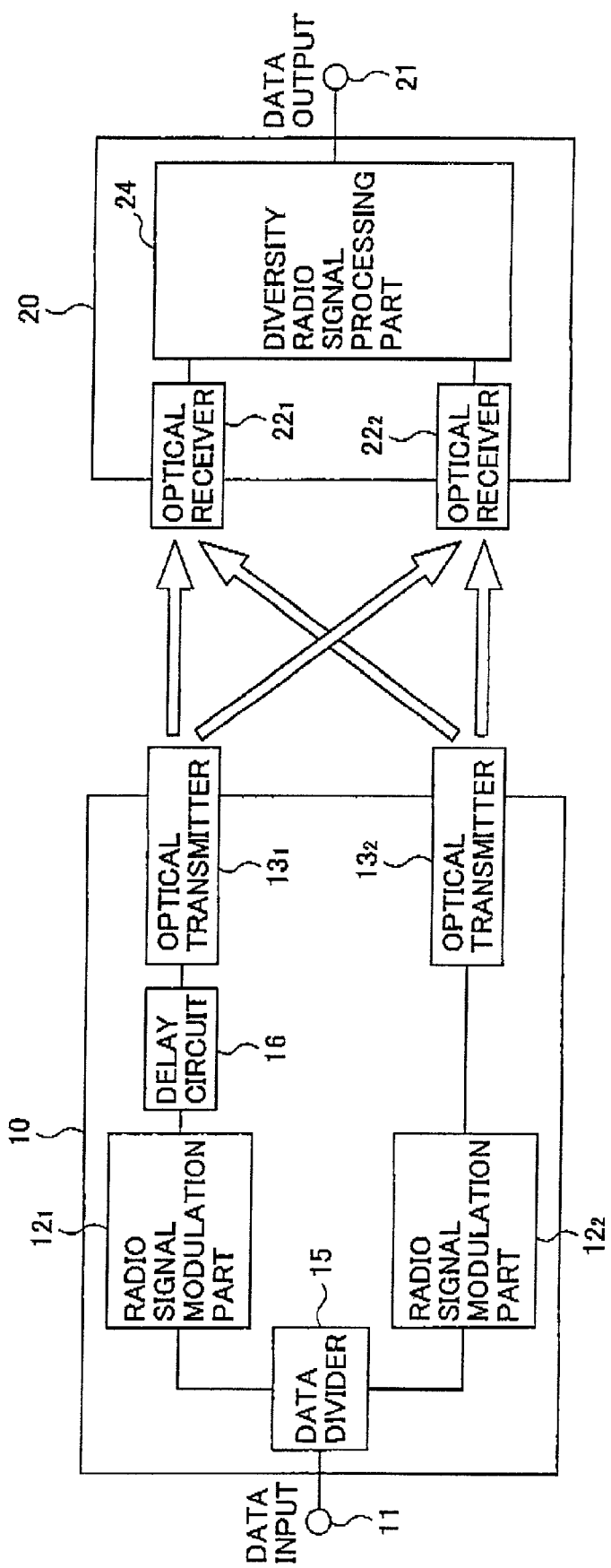
FIG. 11 is a block diagram showing an example of the first embodiment of the present invention in which plurality of optical transmitters and plurality of optical receivers are provided and a part of send signals is delayed (2)

FIGS. 10 and 11 show modifications of FIGS. 6 and 7 respectively, where the delay circuit 16 is inserted in one of the branches. According to the configurations shown in FIGS. 10 and 11, same signals are transmitted from the sending station 10 at different times so that time diversity effect can also be obtained in the receiving station 20. Thus, transmission quality can be further improved.

Figure 12:
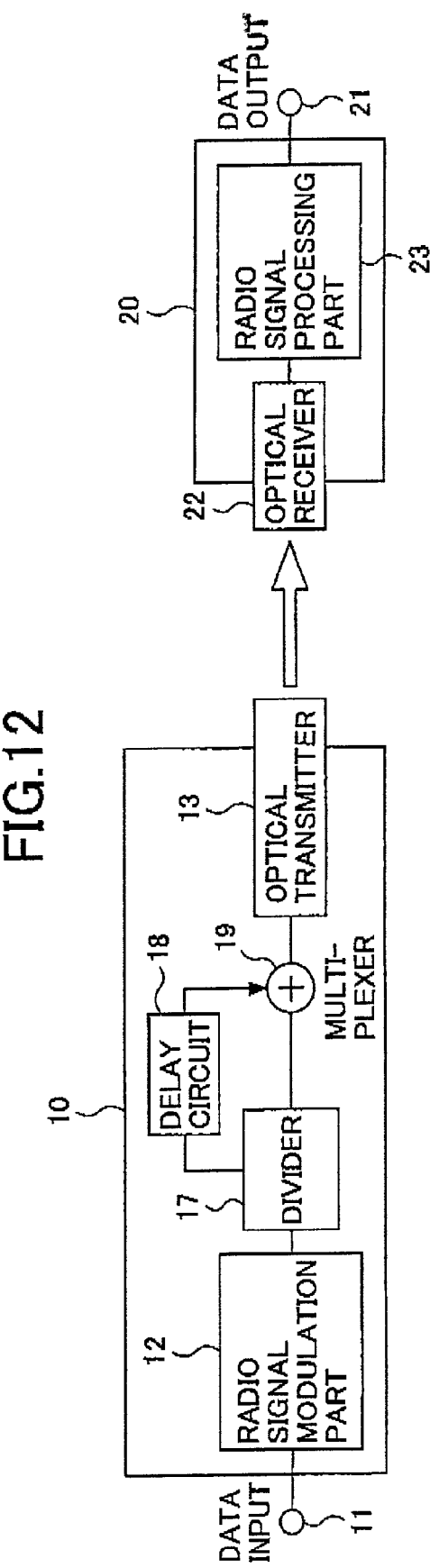
FIG. 12 is a block diagram showing an example of the first embodiment of the present invention in which an optical transmitter and an optical receiver are provided and a delay circuit is provided in the sending station.

In FIG. 12, the information signal input from the input terminal 11 is converted into a radio signal by the radio signal modulation part 12. The output is divided into two signals by a divider 17. One signal is delayed by a delay circuit 18 and combined with another signal by a multiplexer 19. The multiplexed signal is converted into an optical signal and transmitted to the air by the optical transmitter 13.

In the receiving station 20, the optical signal from the sending station 10 is received by the optical receiver 22 and converted into an electrical signal. The output is equalized and combined by the radio signal processing part 23. Thus, the original information signal is obtained and output from the output terminal 21.

According to the configuration shown in FIG. 12, the radio modulation signal is divided, one of the divided signals is delayed and multiplexed with another divided signal. Then, the multiplexed signal is transmitted. The signal is equalized and combined in the receiving station. Accordingly, time diversity effect can be obtained.

Figure 13A:
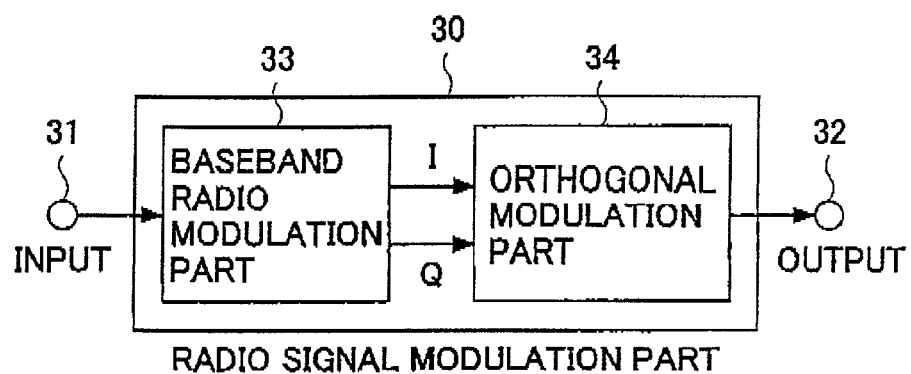
FIGS. 13A and 13B are block diagrams showing radio signal modulation parts.
Figure 13B:
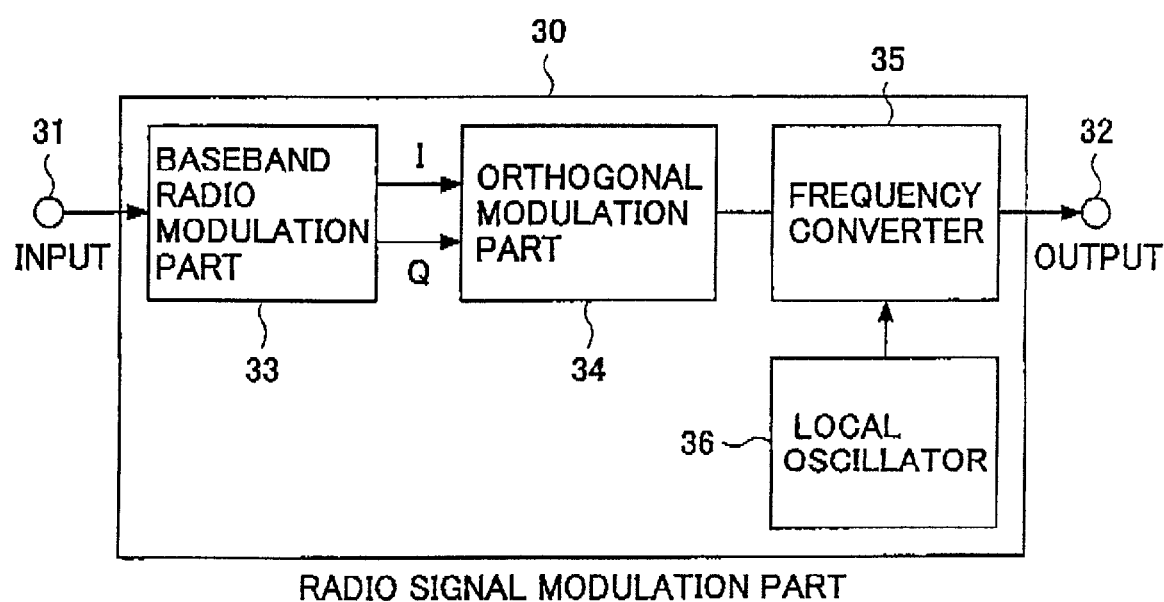

FIGS. 13A and 13B shows configurations of the radio signal modulation part in FIGS. 3-12.

FIG. 13A shows the radio signal modulation part for baseband transmission.

In this configuration, an input information signal is converted into a baseband modulation signal including I (In Phase) component and Q (Quadrature Phase) component by a baseband radio modulation part 33. Then, the I component and the Q component are orthogonally modulated by the orthogonal modulation part 34. Then, the baseband modulation signal is output from the output terminal 32.

FIG. 13B shows the radio signal modulation part for intermediate frequency band or radio frequency band transmission. In this configuration, output from the orthogonal modulation part 34 is converted into a desired frequency band by a local oscillator 36 and a frequency converter 35 and the converted signal is output from the output terminal 32.

Figure 14A:
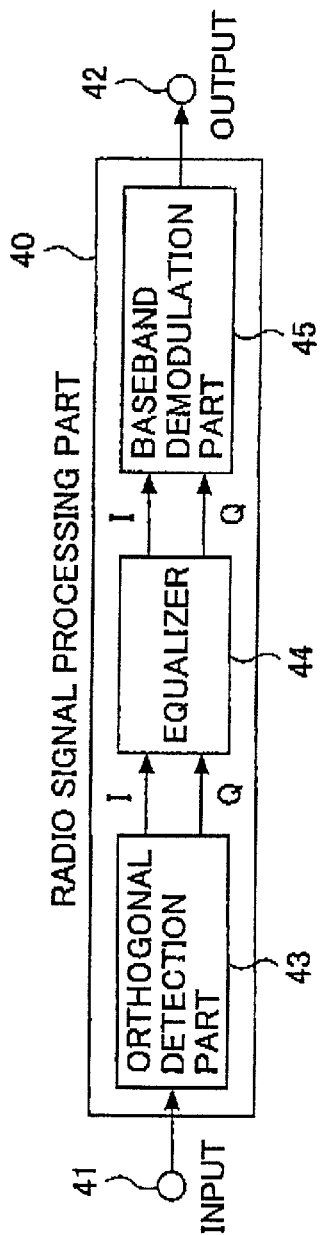
FIGS. 14A and 14B are block diagrams showing radio signal processing parts.
Figure 14B:
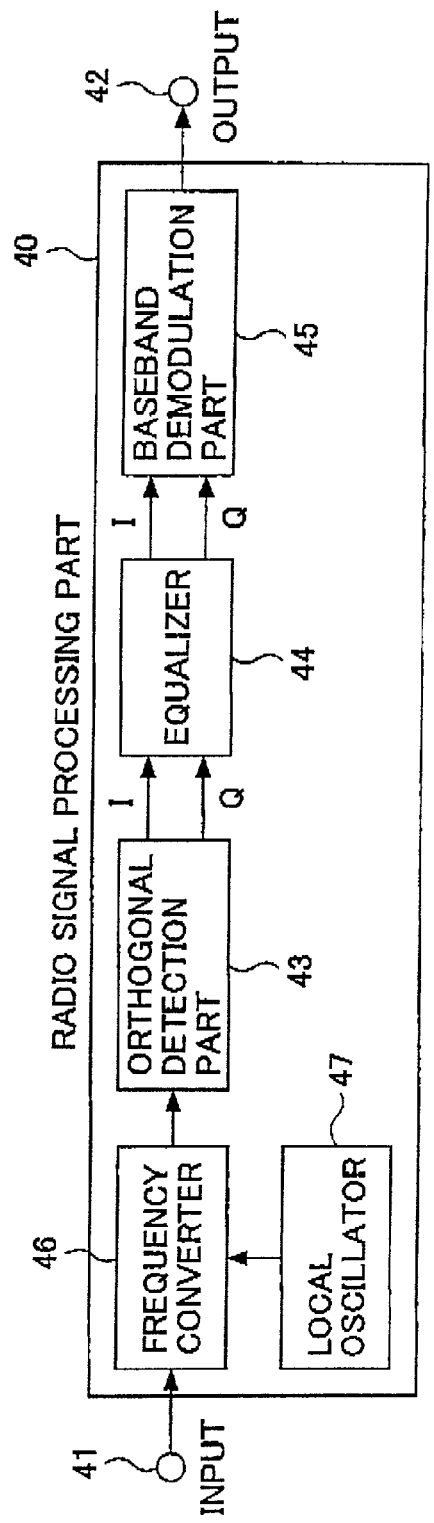

FIGS. 14A and 14B show the radio signal processing part in FIGS. 4, 5, 8, 9, 12. That is, the radio signal processing part is used in the receiving station which includes one optical receiver.

FIG. 14A shows a configuration for baseband transmission. An input baseband radio modulation signal is orthogonally detected by an orthogonal detection part 43 so that the I and Q components are output. As for the I component and the Q component, direct wave component and delay wave component are equalized and combined by an equalizer 44. Then, the I component and the Q component are converted into the original information by a baseband demodulation part 45.

FIG. 14B shows a configuration for intermediate frequency band or radio frequency band transmission. An input radio signal of the intermediate frequency band or the radio frequency band is converted into a baseband signal by a frequency converter 46 and a local oscillator 47. The output is converted into the original information signal by the orthogonal detection part 43, the equalizer 44 and the baseband demodulation part 45.

FIGS. 15A–15C shows examples of the diversity radio signal processing part in the case where the receiving station includes a plurality of optical receivers as shown in FIGS. 3, 6, 7, 10, 11.

FIG. 15A shows the diversity radio signal processing part for baseband transmission. Each of input baseband radio signals is orthogonally detected in an orthogonal detection part $53_1$ or $53_2$ so that I and Q components are output. The outputs from the orthogonal detection parts $53_1$ and $53_2$ are equalized and diversity-combined by a baseband diversity equalization combining part 54. Then, the output from the baseband diversity equalization combining part 54 is converted into original information signal by a baseband demodulation part 55 and the information signal is output.

FIGS. 15B and 15C are for intermediate frequency band or radio frequency band transmission.

FIG. 15B is the diversity radio signal processing part which performs diversity combining in the intermediate frequency band or the radio frequency band.

A plurality of input radio signals of the intermediate frequency band or radio frequency band are diversity combined by a diversity combining part 56. The output is converted into a baseband signal by a frequency converter 57 and a local oscillator 58 and is equalized by an equalizer 59 via an orthogonal detection part 53. Then, the original information signal is obtained by the baseband demodulation part 55 and output from the output terminal 52.

FIG. 15C shows the diversity radio signal processing part for performing diversity combining by baseband.

A plurality of input radio signals of the intermediate frequency band or the radio frequency band are converted into desired intermediate frequency signals by frequency converters $57_1$, $57_2$ and the local oscillator 58. Then, the signals are orthogonally detected by the orthogonal detection parts $53_1$ and $53_2$. The outputs are equalized and diversity-combined by the diversity equalization combining part 54 and converted into the original information signal by the baseband demodulation part 55. The original information signal is output from the output terminal 52.

Figure 16A:
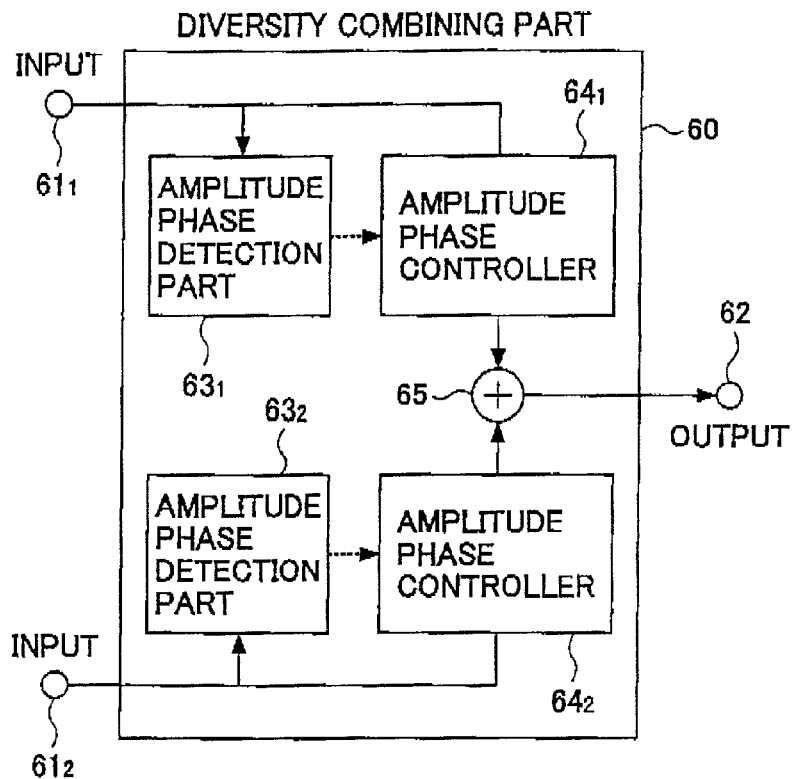
FIGS. 16A–16C are block diagrams showing diversity combining parts.
Figure 16B:
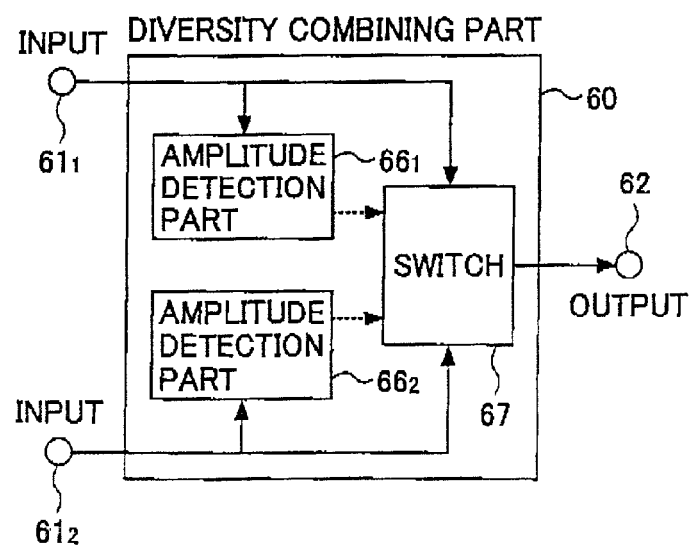
Figure 16C:
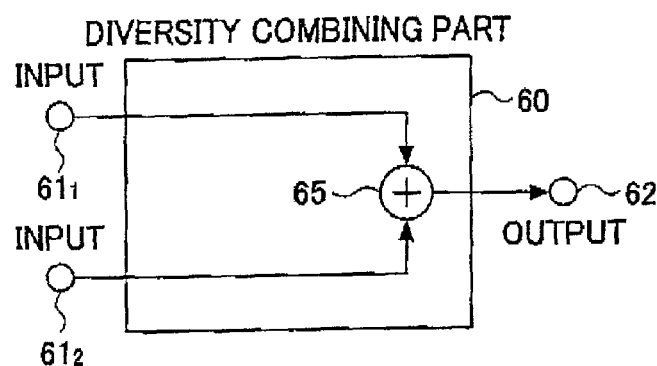

FIGS. 16A–16C show examples of the diversity combining part shown in FIG. 15B which performs diversity combining by intermediate frequency band or radio frequency band.

FIG. 16A shows a configuration for maximum ratio combining. In this configuration, amplitude and phase of signals input from input terminals $61_1$ and $61_2$ are detected by amplitude phase detection parts $63_1$ and $63_2$. On the basis of the amplitude and the phase detected by the amplitude phase detection parts $63_1$ and $63_2$, the amplitude and the phase are controlled by amplitude phase controllers $64_1$ and $64_2$ such that the signals are combined in the same phase and same level. Then, the signals are combined.

FIG. 16B shows a configuration for selection combining. Levels of signals input from the input terminals $61_1$ and $61_2$ are detected by amplitude detection parts $66_1$ and $66_2$. The amplitude detection parts $66_1$ and $66_2$ control a switch 67 according to the detected level such that the higher level signal is switched to the output terminal 62.

FIG. 16C shows a configuration for equal gain combining wherein input signals are combined by the multiplexer 65 and output.

Figure 17A:
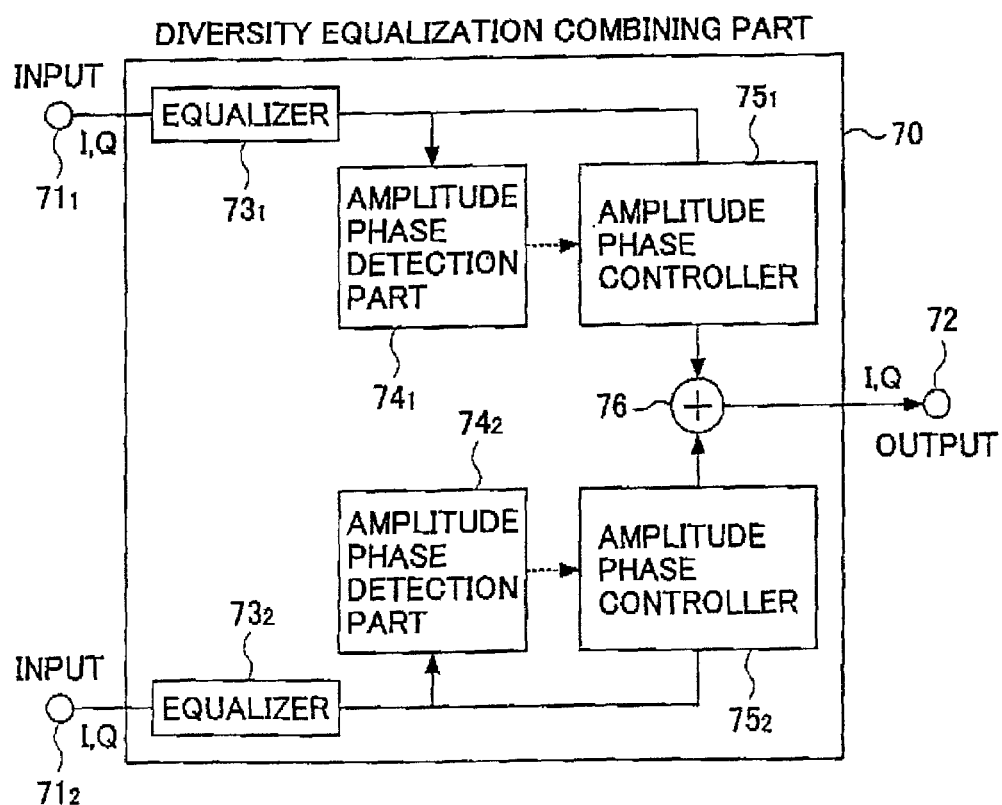
FIGS. 17A–17C are block diagrams showing baseband diversity equalization combining parts (1)
Figure 17B:
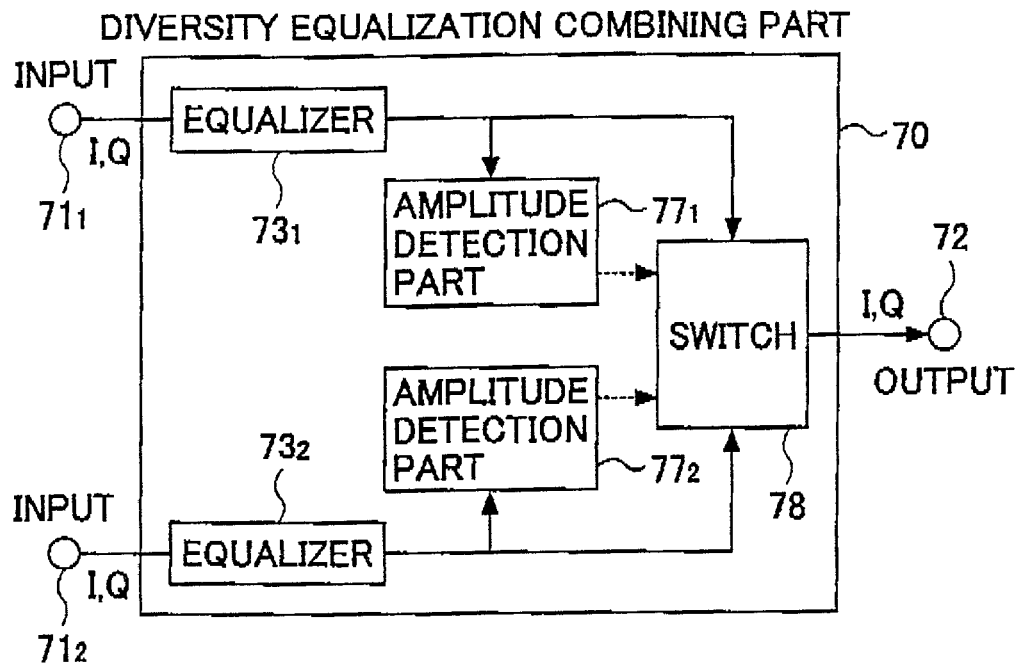
Figure 17C:
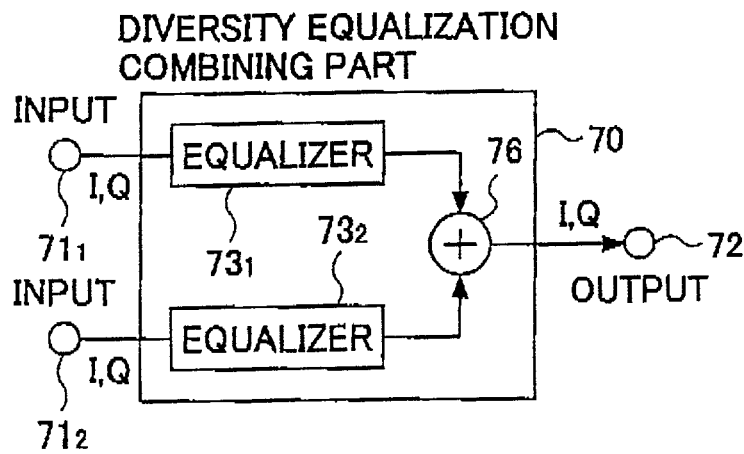

FIGS. 17A–17C show examples of the baseband diversity equalization combining part in FIG. 15A and FIG. 15C in which diversity combining is performed by baseband.

FIG. 17A shows a configuration for maximum ratio combining. FIG. 17B shows a configuration for selection combining. FIG. 17C shows a configuration for equal gain combining. In each configuration, after input X, Q component signals are equalized by equalizers $73_1$ and $73_2$, maximum ratio combining, selection combining or equal gain combining is performed in the same way as shown in FIGS. 16A–16C.

Figure 18:
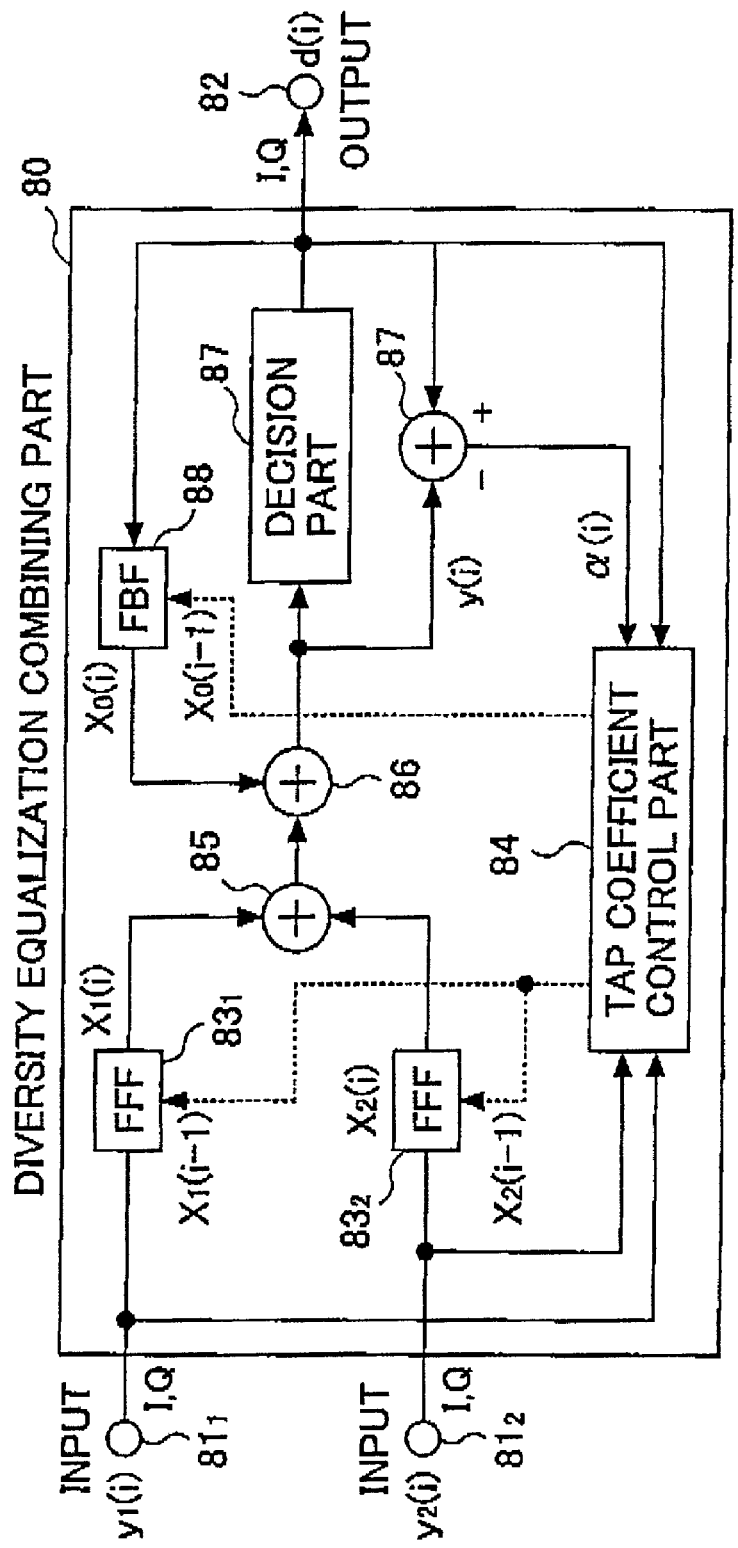
FIG. 18 is a block diagram showing the baseband diversity equalization combining part (2)

FIG. 18 shows another example of the baseband diversity equalization combining part used in FIG. 15A and FIG. 15C.

This example applies a decision feedback type transversal combining diversity. The operation of this configuration will be described in detail in the following.

This example shown in FIG. 18 is for two branch diversity (K=2). However, in the following, a case having K branch diversity which uses K optical receivers will be described.

In FIG. 18, the feed forward filters $83_1$ and $83_2$ (FFF) which corresponds to each receive branch and the feedback filter 88 (FBF) are formed by complex transversal filter since the filters deal with IQ baseband signal which are orthogonally detected from modulation radio signal.

Timing and phase of signals received by each diversity branch may be different for each signal due to delay time difference of transmission lines. Therefore, fractional interval type can be used as the FFF such that timing jitter can be absorbed. The FBF may be symbol time interval of modulation signal.

In the following description, half of symbol time is used as the FFF time interval. In addition, the following description is for K branch diversity in which K optical receivers receive incoming optical signals.

In K optical receivers, a radio modulation signal output from Kth optical receiver is input to the orthogonal detection part (for example, the orthogonal detection part 53 in FIG. 15A, FIG. 15C) and is orthogonally detected. After orthogonal detection, the radio modulation signal becomes a baseband signal having in-phase component (I component) and quadrature component (Q component). By sampling the I, Q baseband signals by using A/D converters (not shown in the figure), sampling value series of complex baseband signal are obtained and input to the input terminals $81_1$ and $81_2$.

Since the FFF in this embodiment uses half of the symbol time as the time interval, when symbol interval is T, sampling values of complex baseband signal of T/2 time interval are used as the input signal sampling series. When assuming that the input signal sampling series at time t=iT in the Kth branch is input signal vector $X_k(i)$, $$X_k^H(i)=[y_k^*(i)\ y_k^*(i-\tfrac{1}{2})\ \ldots\ y_k^*(i-(N_F-1)/2)] \quad (1),$$

wherein * indicates complex conjugate, $N_F$ indicates tap number of FFF. Tap coefficient vector $W_k(i)$ of the FFF corresponding to the Kth branch can be represented as $$W_k^H(i)=[W_{k,i}^*(0)\ W_{k,i}^*(1)\ \ldots\ W_{K,i}^*(N_F-1)] \quad (2).$$

In addition, assuming that judgment value, that is, input value to the FBF is d(i), tap signal $X_0(i)$ of FBF is represented by $$X_0(i)=[d^*(i-1)\ d^*(i-2)\ \ldots\ d^*(i-N_B)] \quad (3),$$

wherein $N_B$ is the tap number of FBF. Tap coefficient $W_0(i)$ of FBF is represented as $$W_0^H(i)=[W_{0,i}^*(0)\ W_{0,i}^*(1)\ \ldots\ W_{0,i}^*(N_B)] \quad (4).$$

Signal vector X(i) obtained from the equations (1) and (3) and tap coefficient vector W(i) obtained from the equations (2) and (4) can be defined as follows.

$$X^H(i)=[X_0^H(i)\ X_1^H(i)\ X_2^H(i)] \quad (5)$$

$$W^H(i)=[W_0^H(i)\ W_1^H(i)\ W_2^H(i)] \quad (6)$$

These are M dimension vector in which $M=2N_F+N_B$. A predicted value W(i−1) obtained at time i−1 is used as the tap coefficient to be used at time i. Thus, input signal y(i) to the judgement part is represented as $$y(i)=W^H(i-1)\ X(i) \quad (7).$$

A pre-estimation error α (i) can be represented by the following equation by using d(i).

$$\alpha(i)=d(i)-y(i) \quad (8)$$

When RLS (Recursive Least Squares) algorithm is applied by using these variables, the tap coefficient vector W(i−1) can be updated in the following way.

$$P(0)=\delta^{-1}I \quad (9a)$$

$$W(0)=[0] \quad (9b)$$

$$k(i)=\{\lambda^{-1}P(i-1)X(i)\}/\{1+\lambda^{-1}X^H(i)P(i-1)X(i)\} \quad (10a)$$

$$\alpha(i)=d(i)-W^H(i-1)X(i) \quad (10b)$$

$$W(i)=W(i-1)+k(i)\alpha^*(i) \quad (10c)$$

$$P(i)=\lambda^{-1}P(i-1)-\lambda^{-1}k(i)X^H(i)\ P(i-1) \quad (10d)$$

wherein the equations (9a) and (9b) indicate an initial condition, δ is a small positive real number, P(i) is M×N square matrix, I is a unit matrix, [0] is zero vector, the equations (10a)–(10d) are sequential equations, λ is forgetting coefficient, and k(i) is Kalman coefficient.

According to the above-mentioned operation, complex baseband signal processing is performed for each diversity branch corresponding to input signal from each optical receiver. Thus, equalized diversity combining can be realized.

In addition, according to the present invention, other algorithms such as LMS (Least Mean Squares) algorithm can be used as the adaptive algorithm.

In the decision feedback type transversal combining diversity, transmission line distortion can be removed by adjusting the tap coefficient by using the adaptive algorithm for the transmission route including optical space propagation route. Therefore, distortion in optical space propagation route such as spot dancing, beam bending, scintillation; propagation delay distortion and the like can be corrected so that transmission quality can be improved.

The key feature is that, instead of correcting the optical modulation signal directly, information signal is converted to radio modulation signal and the radio modulation signal is transmitted, and the distortion of the optical space propagation route can be corrected by signal processing for radio baseband signal.

As mentioned above, according to the first embodiment, the information signal is modulated into baseband signal and transmitted by the air optically in a communication system in which optical space transmission is used to connect points. Thus, the signal processing technique used in radio communication such as equalization, diversity combining and the like can be applied. As a result, degradation of transmission quality and line disconnection due to humidity and temperature fluctuations of the air can be decreased. Therefore, a high quality optical space transmission system, a high quality optical space transmission method and a high quality optical space transmission apparatus can be provided.

Second embodiment

Next, a second embodiment of the present invention corresponding to the second object will be described with reference to accompanying figures. The second embodiment will be described by using examples from 2-1 to 2-5. Like reference numerals indicate like elements throughout the several views.

In the second embodiment, the object is achieved by combining optical space transmission in the first embodiment and radio transmission.

(Example 2-1)

Figure 19:
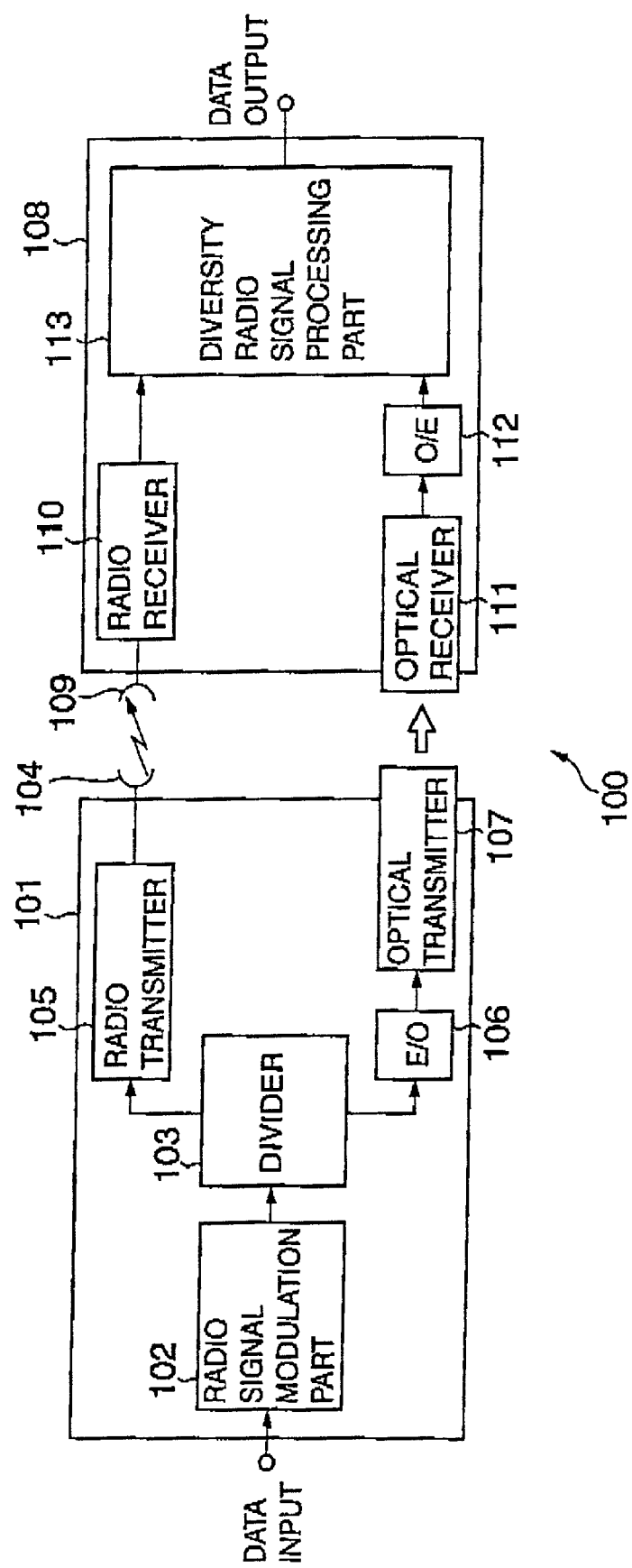
FIG. 19 is a block diagram of an information transmission system of an example 2-1 of a second embodiment of the present invention.

In the following, a configuration and an operation of an information transmission system of the present invention will be described with reference to FIG. 19.

First, a configuration of an information transmission system of this example will be described. A sending station 101 includes a radio signal modulation part 102 which converts input data (information signal) into a radio modulation signal of radio frequency band, a divider 103 which divides a radio modulation signal into two routes, a radio transmitter 105 which sends a radio modulation signal to an antenna 104 to the air, an electrical/optical (E/O) converter 106 which converts the radio modulation signal to an optical signal, and an optical transmitter 107 which sends the optical signal to the air.

The receiving station 108 includes a radio receiver 110 which receives a radio signal via an antenna 109, an optical receiver 111 which receives an optical signal, an optical/electrical (O/E) converter 112 which converts a received optical signal into an electrical signal, a diversity radio signal processing part 113 which converts radio signals input from two routes into original data (information signal) by performing diversity combining and demodulation.

The divider 103 outputs a radio modulation signal to the radio transmitter 105 and an E/O converter 106. The diversity radio signal processing part 113 performs diversity combining processing on an output from the radio receiver 110 and an output from the O/E converter 112. The configuration of the diversity radio signal processing part 113 of this example will be described later.

Next, an operation of the information transmission system 100 will be described. In the sending station 101, data (information signal) input from the input terminal is converted into a radio modulation signal of radio frequency band by the radio signal converter 102, and the radio modulation signal is input to the radio transmitter 105 and the E/O converter 106 by the divider 103.

The radio modulation signal input to the radio transmitter 105 is sent to the air via the antenna 104. The radio modulation signal input to the E/O converter 106 is converted into an optical signal, and sent to the air by the optical transmitter 107.

The radio signal which is sent is received by the radio receiver 110 via the antenna 109 and is output to the diversity radio signal processing part 113. On the other hand, in the receiving station 108, a transmitted optical signal is received by the optical receiver 111, converted into an electronic signal by the O/E converter 112, and the electrical signal is output to the diversity radio signal processing part 113.

The radio signal output from the radio receiver 110 and the radio signal output from the O/E converter 112 are diversity-combined by the diversity radio signal processing part 113. In addition, the signals are demodulated into original data (information signal), and the data is output to the output terminal.

As mentioned above, according to this embodiment, the same information signal is spatially transmitted by using two transmitting systems for transmitting a radio signal and transmitting an optical signal, and the receiving station diversity-combines received signals of the two systems. Thus, if one signal of the two systems is largely attenuated due to rain or fog, another signal is not attenuated largely Therefore, resistance to both of rain and fog can be improved.

In addition, even when both signals of the two systems are attenuated due to fog and rain, communication quality can be improved by diversity-combining both signals in the receiving station (Example 2-2)

Figure 20:
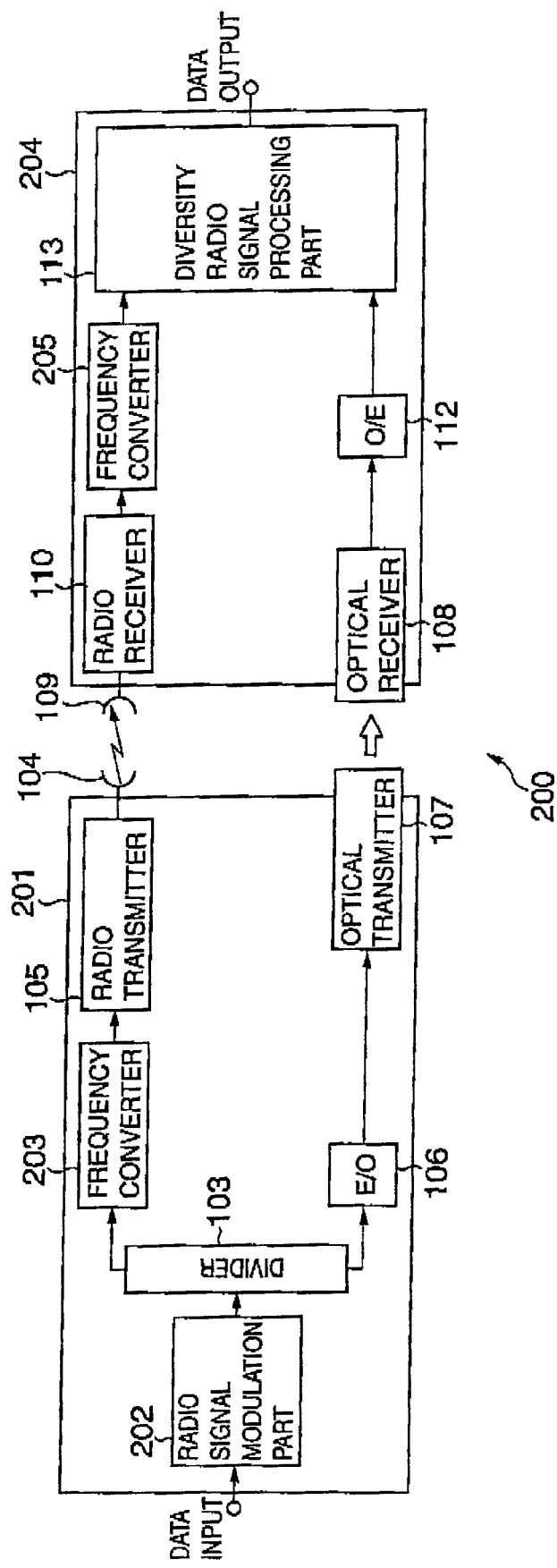
FIG. 20 is a block diagram of the information transmission system of an example 2-2 of the second embodiment of the present invention.

Next, an information transmission system of an example 2-2 of the present invention will be described with reference to FIG. 20. FIG. 20 is a block diagram of the information transmission system of the example 2-2 of the present invention.

This example is the same as the example 2-1 basically. However, in this example, the sending station converts input data (information signal) to a radio modulation signal of intermediate frequency band. In FIG. 20, the same numbers are assigned to the same components as those of the example 2-1.

In a sending station 201 in an information transmission system 200 of this example, an radio signal modulation part 202 converts input data (information signal) into a radio modulation signal of intermediate frequency band. A frequency converter 203 converts frequency of the radio modulation signal from the intermediate frequency band to radio frequency band.

In a receiving station 204, a frequency converter 205 converts frequency of input radio modulation signal from the radio frequency band to the intermediate frequency band. The configuration of the diversity radio signal processing part 113 will be described later in detail.

Accordingly, by converting input data (information signal) into the radio modulation signal of the intermediate frequency band before the data is input to the divider 103, frequency band of the radio modulation signal input to the E/O converter 106 becomes the intermediate frequency band. Accordingly, operating frequency characteristic of an E/O conversion device which forms the E/O converter 106 is not necessarily applicable to high frequency band. Thus, it becomes possible to adopt a cheaper device. This is also true for the O/E converter 112 in the receiving station 204.

According to this example, since signal processing is performed such that frequency band of the radio modulation signal input to the E/O converter and the O/E converter is converted into the intermediate frequency band, cost performance can be improved.

(Example 2-3)

Next, an information transmission system of an example 2-3 of the present invention will be described with reference to FIG. 21. FIG. 21 is a block diagram of the information transmission system of the example 2-3 of the present invention.

This example is the same as the example 2-1 basically. However, input data (information signal) is converted into a digital signal in the sending station. In FIG. 21, the same numbers are assigned to the same components as those of the example 2-1.

In a sending station 301 in an information transmission system 300 of this example, a digital modulation part 302 converts input data (information signal) to a radio modulation signal by digital signal processing, and the radio modulation signal is output as a digital signal. A digital/analog (D/A) converter 303 converts input radio modulation signal from a digital signal to an analog signal A frequency converter 304 converts frequency of the radio modulation signal which is the input analog signal into radio frequency band. A signal converter 305 converts the radio modulation signal which is the input digital signal into a signal format (level, clocks and the like) suitable for optical communication.

In a receiving station 306, a frequency converter 307 converts frequency of the input radio modulation signal from the radio frequency band to baseband. An analog/digital (A/D) converter 308 converts the radio modulation signal which is the input analog signal into an digital signal. A signal converter 309 converts input radio modulation signal into a signal format for diversity processing. The configuration of the diversity radio signal processing part 113 will be described later in detail.

As mentioned above, by converting input data into a digital signal before the data is input to the divider 103, digital transmission is performed in the optical space transmission section. Thus, necessary power for transmission becomes lower than the optical space transmission of the radio modulation signal in radio frequency band and intermediate frequency band.

According to this embodiment, it becomes possible to decrease transmission power by using digital transmission in the optical space transmission section Therefore, the apparatus can become simple and cost performance can be improved.

Figure 22A:
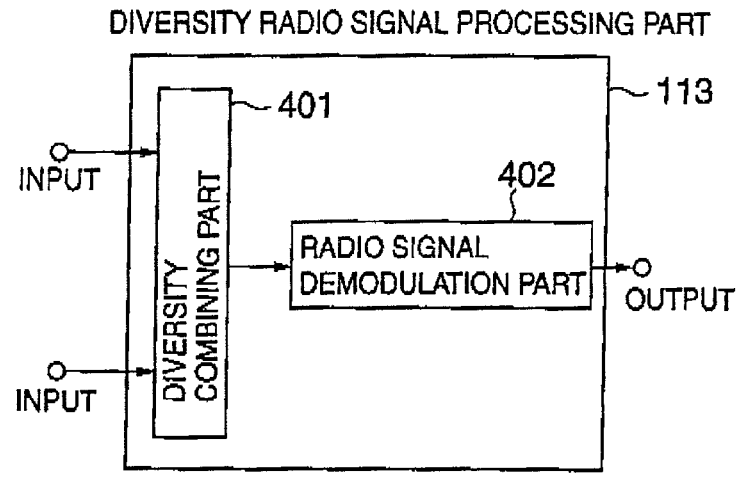
FIGS. 22A–22C show example block diagrams of a diversity radio signal processing part 113.
Figure 22B:
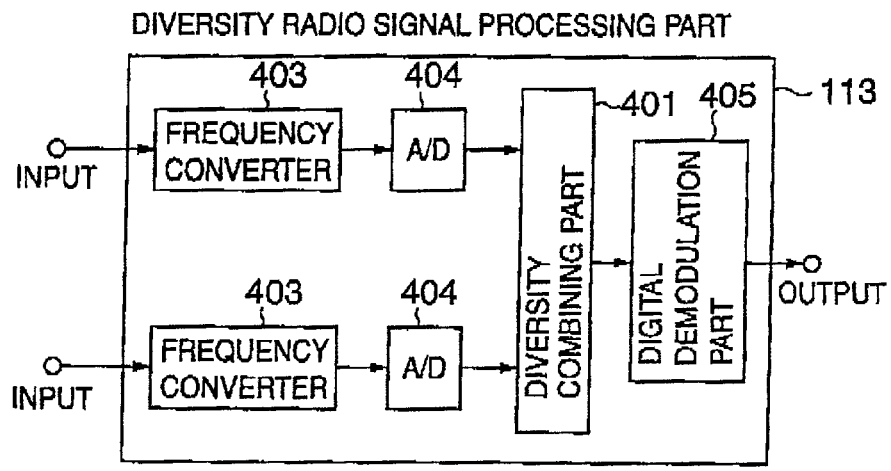
Figure 22C:
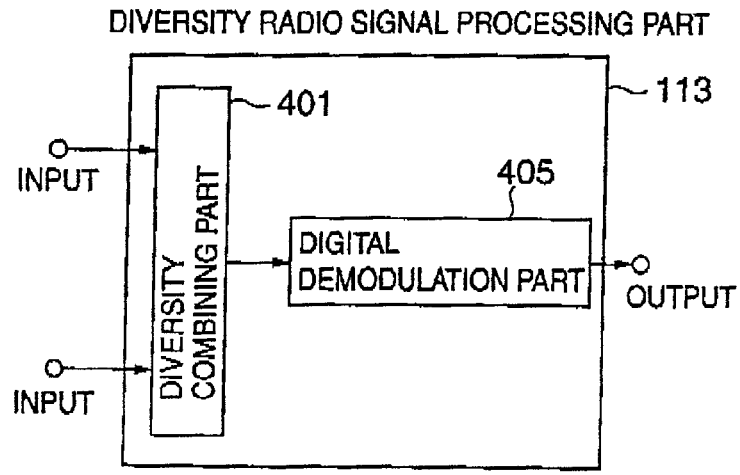

In the following, the diversity radio signal processing part used in the examples 2-1-2-3 will be described in detail. FIGS. 22A–22C show example block diagrams of the diversity radio signal processing part 113. FIG. 22A shows a configuration for performing radio frequency band (or intermediate frequency band) combining processing for performing radio transmission by the radio frequency band (or intermediate frequency band) (in the example 2-1 or 2-2). FIG. 22B shows a configuration for performing digital combining processing for radio transmission by the radio frequency band (or intermediate frequency band) (in the example 2-1 or 2-2). FIG. 22C shows a configuration for digital transmission (in the example 2-3). In the configurations, diversity combining processing in the diversity combining part 401 will be described later.

In FIG. 22A, two input radio modulation signals of radio frequency band (or intermediate band) are diversity-combined by the diversity combining part 401, and demodulated into original data (information signal) by a radio signal demodulation part 402. In the demodulation by the radio signal demodulator 402, the radio frequency band is converted to baseband in the example 2-1. The intermediate frequency band is converted into baseband in the example 2-2.

In FIG. 22B, each of two input radio modulation signals of radio frequency band is converted into a signal of intermediate frequency band by the frequency converter 403. Then, the signal is converted into a digital signal by the A/D converter 404. Then, the signals are diversity-combined by the diversity combining part 401, and demodulated into original data (information signal) by the digital demodulation part 405.

If a signal of the radio frequency band is input into the A/D converter, load of the A/D converter becomes large. Thus, the frequency converter 403 is provided to decreasing the load. Therefore, in the example 2-2, since the radio signal input to the diversity radio signal processing part 113 is already a signal of intermediate frequency band, the frequency converter 403 is unnecessary.

In FIG. 22C, two input radio modulation signals which are digital signals are diversity-combined by the diversity combining part 401, and demodulated into original data (information signal) by a digital demodulation part 405.

Figure 23A:
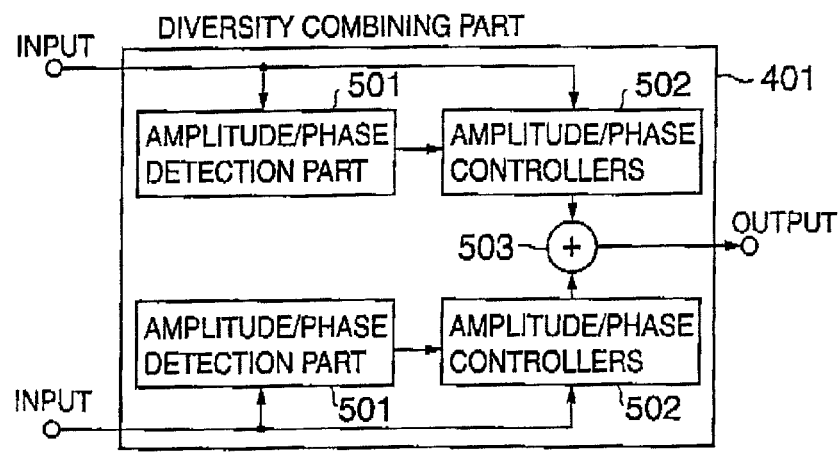
FIGS. 23A–23C show example block diagrams of a diversity combining part.

Next, configuration examples of the diversity combining part 401 in the above configurations (FIGS. 22A–22C) will be described with reference to FIGS. 23A–23C. FIG. 23A shows a configuration when the diversity combining part 401 performs maximum ratio combining, FIG. 23B shows a configuration when the diversity combining part 401 performs selection combining, and FIG. 23C shows a configuration when the diversity combining part 401 performs equal gain combining.

In FIG. 23A, for each of input two signals, amplitude and phase are detected by an amplitude/phase detection part 501. In addition, amplitude and phase are controlled on the basis of amplitude and phase which are detected by the amplitude/phase controllers 502 such that signals phase and level of the two signals becomes the same, and the signals are combined and output by a multiplexer 503.

Figure 23B:
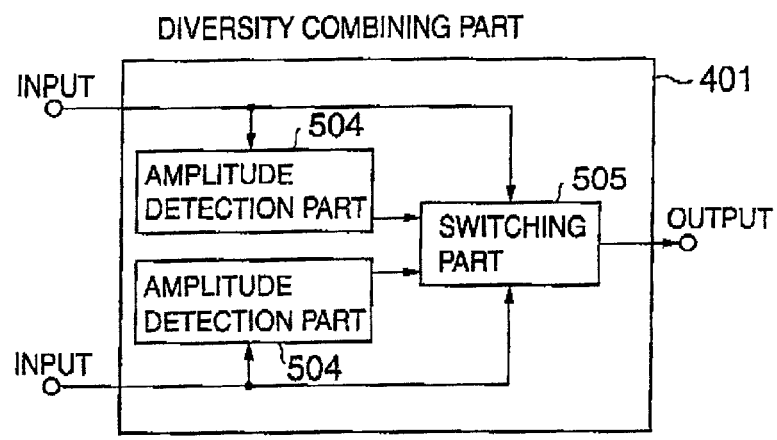

In FIG. 23B, for each of input two signals, amplitude is detected by amplitude detection parts 504, and higher level signal is output by a switching part 505.

Figure 23C:
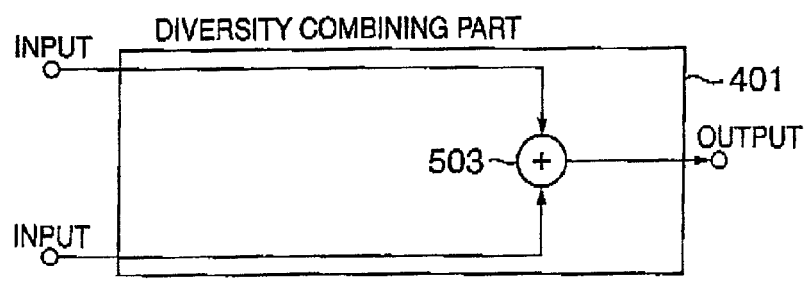

In addition, in FIG. 23C, input two signals are combined by the multiplexer 503 and output.

Each of the configurations of the diversity radio signal processing part 113 may perform any kind of above-mentioned diversity combining processing, in which any combination can be taken.

In addition, the radio signal modulation part and the diversity radio signal processing part in the first embodiment can be applied to each example of the second embodiment.

(Example 2-4)

Figure 24:
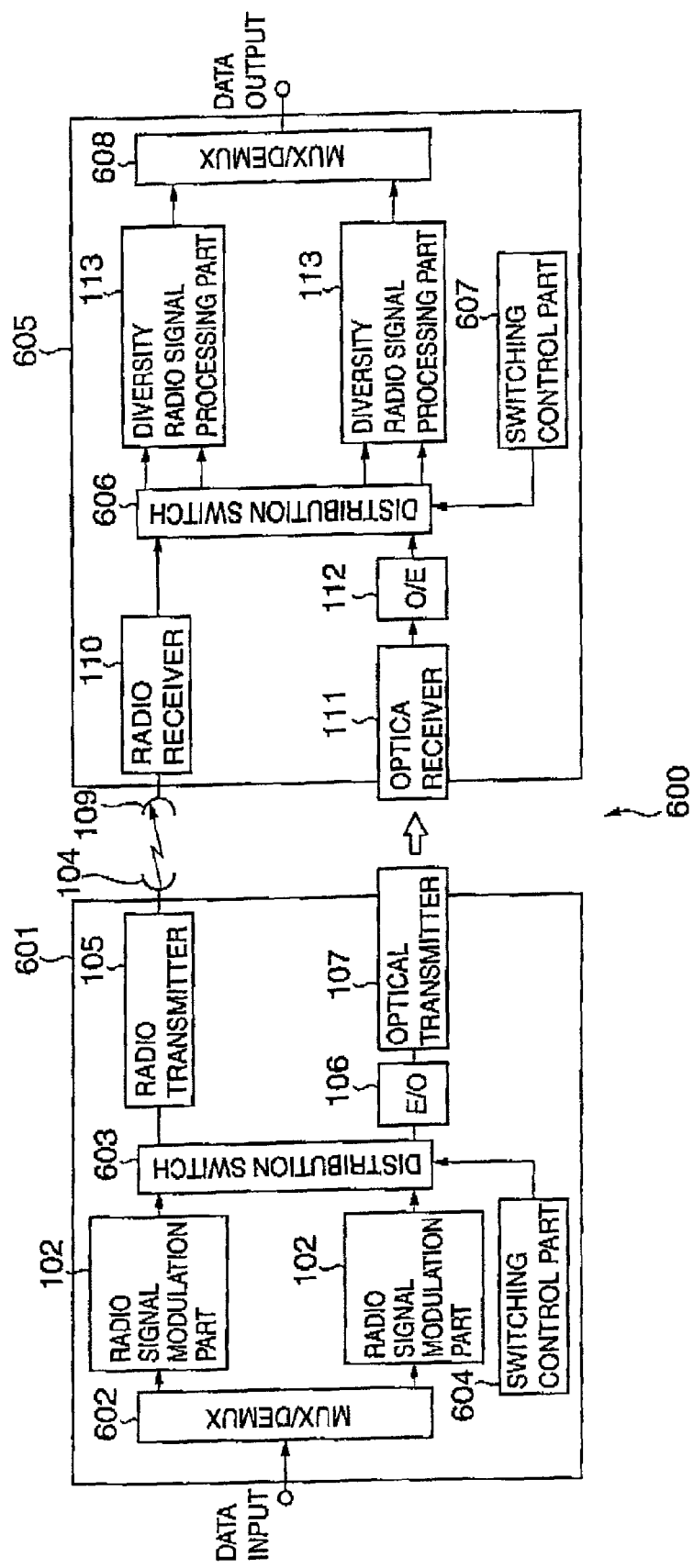
FIG. 24 is a block diagram of the information transmission system of an example 2-4 of the second embodiment of the present invention.

Next, an information transmission system of the example 2-4 of the present invention will be described. FIG. 24 shows a block diagram of an information transmission system 600 of the example 2-4 of the present invention.

The configuration of this example is the same as that of the example 2-1 basically. However, in this example, signals are transmitted by using two transmission systems each of which systems conveys different signal so as to increase transmission capacity when atmospheric attenuation is relatively small such as in fine weather, that is, when propagation loss in transmission routes is relatively small. In FIG. 24, the same numbers are assigned to the same components as those of the example 2-1.

In a sending station 601 in FIG. 24, multiplexer/demultiplexer (MUX/DEMUX) 602 divides an input signal into a plurality of signals (two signals in this case), Each of the divided signals is output to the radio signal modulation part 102. A switching control part 604 controls switching of output destination of a distribution switch 603, and the distribution switch 603 outputs input radio modulation signals to a radio transmitter 105 or an E/O converter 106.

In a receiving station 605, a switching control part 607 controls switching of output destination of a distribution switch 606, and the distribution switch 606 outputs an input radio modulation signal to one of a plurality of diversity radio processing parts (two in this case) 113. The MUX/DEMUX 608 multiplexes signals which are divided original data signals each of which are combined and demodulated by each diversity radio signal processing part so as to output complete original data (information signal).

Figure 25:
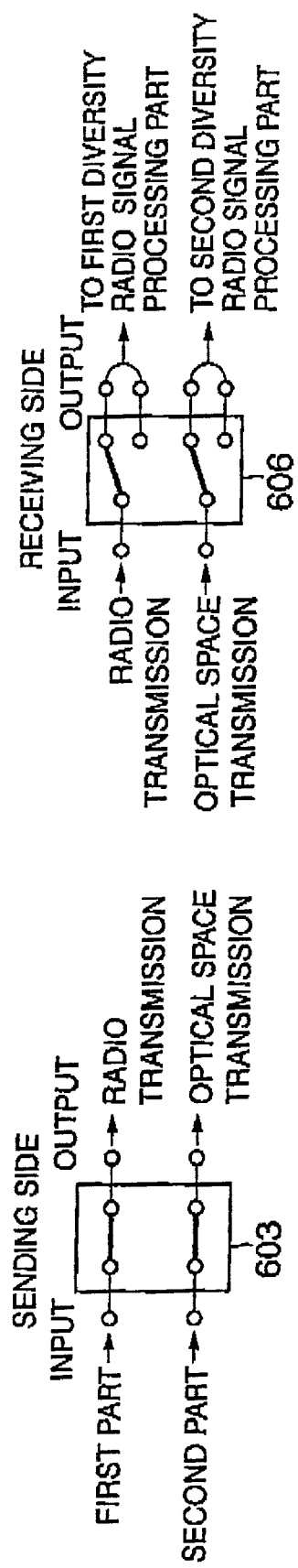
FIG. 25 is a schematic diagram showing switching states of distribution switches 603 and 606 when propagation loss in the propagation route is relatively small.

In the following, a distribution method by the distribution switch 603 and 606, that is, a switching control method by the switching control part 604 and 607 will be described with reference to FIGS. 25, 26A and 26S. FIG. 25 is a schematic diagram showing switching states of the distribution switches 603 and 606 when propagation loss in the propagation route is relatively small (when condition of the propagation route is good due to good weather). FIGS. 26A and 26B are schematic diagrams showing switching states of the distribution switches 603 and 606 when propagation loss in the propagation route is relatively large (when condition of the propagation route is bad due to rain or fog). Here, signals which are divided from an information signal by the MUX/DEMUX 602 in the sending station 601 will be called a first signal part and a second signal part. In addition, one of the two diversity radio signal processing parts 113 in the receiving station 605 will be called a first diversity radio signal processing part 113 and another will be called a second diversity radio signal processing part 113.

As shown in FIG. 25, when propagation loss of the propagation route is relatively small, the switching control part 604 in the sending station 601 controls the distribution switch 603 such that the first signal part of the information signal is output to a radio transmission route and the second signal part is output to an optical space transmission route.

The switching control part 607 in the receiving station 605 controls the distribution switch 606 such that the signal received from the radio transmission route is output to the first diversity radio signal processing part 113 and the signal received from the optical space transmission route is output to the second diversity radio signal processing part 113. That is, in this case, combining processing is not performed in each diversity radio signal processing part 113. Only multiplexing by the MUX/DEMUX 608 is performed.

According to the above-mentioned configuration, when propagation loss in the propagation route is relatively small so that condition of the route is good, transmission capacity can be doubled by transmitting different signals by using the radio transmission route and the optical space transmission route.

On the other hand, when the propagation loss in the propagation route is relatively large, the switching control part 604 in the sending station 601 controls the distribution switch 603 such that the first signal part is output to the radio transmission route and to the optical space transmission route first as shown in FIG. 26A. Next, the switching control part 604 in the sending station 601 controls the distribution switch 603 such that the second signal part is output to the radio transmission route and to the optical space transmission route as shown in FIG. 26B.

The switching control part 607 in the receiving station 607 controls the distribution switch 606 such that the first signal parts received from the radio transmission route and the optical space transmission route are output to the first diversity radio signal processing part 113 as shown in FIG. 26A. In addition, the switching control part 607 in the receiving station 607 controls the distribution switch 606 such that the second signal parts received from the radio transmission route and the optical space transmission route are output to the second diversity radio signal processing part 113 as shown in FIG. 26B. The first signal parts are combined by the first diversity radio signal processing part 113 and the second signal parts are combined by the second diversity radio signal processing part 113.

According to the above-mentioned configuration, when the propagation loss of the propagation route is relatively large so that the condition of the propagation route is bad, the same information signal is sent by using the radio transmission route and the optical space transmission route, and diversity combining processing is performed in the receiving side. Therefore, communication quality can be maintained.

(Example 2-5)

Figure 27:
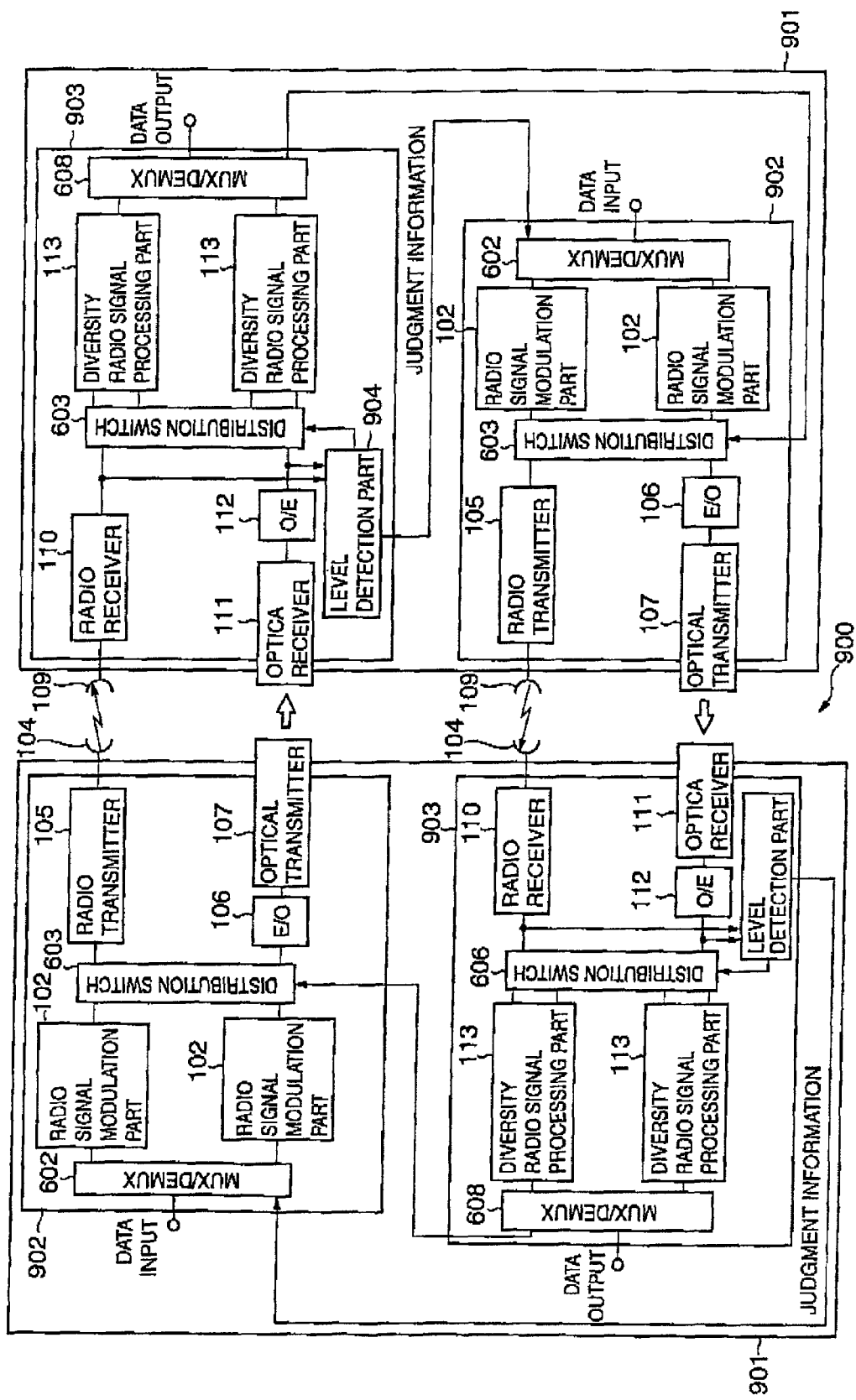
FIG. 27 is a block diagram of the information transmission system of an example 2-5 of the second embodiment of the present invention.

Next, an information transmission system of the example 2-5 of the present invention will be described with reference to FIG. 27. FIG. 27 is a block diagram of an information transmission system 900 of the example 2-5 of the present invention.

This example is basically the same as that of the example 2-4. In this example, stations each having the sending station and the receiving station of the example 2-4 communicate each other in which switching of distribution switches is controlled on the basis of receive level in each station. In FIG. 27, the same numbers as in the information transmission system of the example 2-4 in FIG. 24 are assigned to the same components in this embodiment.

As shown in FIG. 27 which shows a case in which communication stations 901 communicate with each other, each communication station 901 includes a send part 902 corresponding to the sending station 601 in FIG. 24, and a receive part 903 corresponding to the receiving station 605.

The receive part 903 has a level detection part 904 for monitoring receive level of the radio transmission route and the optical space transmission route. The level detection part 904 judges the condition of the propagation route (that is, magnitude of propagation loss), and judges whether parallel (independent) transmission shown in FIG. 25 should be performed or diversity transmission shown in FIGS. 26A and 26B should be performed.

The judgment information is transferred to the MUX/DEMUX 602 in the send part 902, and is sent to the communication station at the other end with data (information signal). In the communication station at the other end which received the judgment information, the judgment information is separated from the data (information signal) by the MUX/DEMUX 608 of the receive part 903, and the judgment information is sent to the distribution switch 603 of the send part 902 as a switching control signal.

The distribution switch 603 performs switching such that the parallel transmission is performed when it is judged that the condition of the propagation route is good (propagation loss is relatively small). In addition, the distribution switch 603 performs switching such that the diversity transmission is performed when it is judged that the condition of the propagation route is bad (propagation loss is relatively large).

The judgment information output from the level detection part 904 is also input to the distribution switch 606 in the receive part 903, and the same switching control is performed.

According to this example, a closed loop is formed in which the judgment information based on the receive level of the routes is returned to the send part. The distribution switches of both of the sending station and the receiving station can be controlled in the same way.

In the above-mentioned description, the examples 2-4 and 2-5 use radio frequency band like the example 2-1. However, intermediate frequency band can also be used like the example 2-2. In addition, digital signal can also be used like the example 2-3.

In the examples 2-1–2-5, although a case in which one radio transmission route and one optical space transmission route are used has been described, the present invention is not limited to these examples.

In addition, in the examples 2-4 and 2-5, although a case in which magnitude of propagation loss, that is, condition of propagation route is judged from receive level in the receiving station has been described, the present invention is not limited to this method. The condition of the propagation route can be judged from other parameter, and can be judged by using other methods.

In addition, in the examples 2-4 and 2-5, although a case in which each of the first and second signal parts is transmitted by radio route and optical route when propagation condition is bad has been described, the information signal may not be divided into the first and second signal parts since the main purpose of this example is to transmits the information signal by using the two routes when propagation condition is bad.

Further, the diversity combining processing can be performed by using other methods.

According to the information transmission method of the second embodiment, even when one of signals in the two systems is largely attenuated due to rain or fog, other signal is not largely attenuated. Therefore, resistance to both of rain and fog can be improved. In addition, even when the signals of the two systems are attenuated by rain and fog, communication quality can be improved.

Further, transmission capacity can be doubled, and a first transmission mode in which transmission capacity is doubled and a second transmission mode in which communication quality is maintained can be used selectively.

Further, since a signal to be applied to the electrical/optical converter is converted to a radio signal of intermediate frequency band, it becomes unnecessary to use a device applicable to high frequency band in which operating frequency characteristic is radio frequency band as the electrical/optical converter. Thus, cost performance can be improved.

Further, transmission power can be decreased by using digital transmission in the optical space transmission section. Thus, apparatuses can be simpler and cost performance can be improved.

The present invention is not limited to the specifically disclosed embodiments, and variations and modifications may be made without departing from the scope of the invention.

What is claimed is:

1. An information transmission system for transmitting information from a sending apparatus to a receiving apparatus, said information transmission system comprising said sending apparatus and said receiving apparatus which include a mode selection part for selecting one of a first transmission mode and a second transmission mode,
said sending apparatus comprising:
a demultiplexer configured to segment an information signal into a first data signal and a second data signal that are different from each other;
radio signal modulation parts configured to modulate said first data signal and said second data signal;
a control part configured to control said sending apparatus such that said first data signal is transmitted to said receiving apparatus as a radio signal and said second data signal is transmitted to said receiving apparatus as an optical signal when said first transmission mode is selected;
said control part controlling said sending apparatus such that said information signal is transmitted to said receiving apparatus via a plurality of routes including a radio transmission route and an optical transmission route when said second transmission mode is selected,
said receiving apparatus comprising:
a part configured to multiplex said first data signal and said second data signal when said first transmission mode is selected; and
a part configured to diversity-combine said information signal which is transmitted via said plurality of routes when said second transmission mode is selected.

2. The information transmission system as claimed in claim 1, wherein said mode selection part selects said first transmission mode when transmission routes between said sending apparatus and said receiving apparatus are in a first condition, and said mode selection part selects said second transmission mode when said transmission routes between said sending apparatus and said receiving apparatus are in a second condition which is worse than said first condition.

3. An information transmission method used for transmitting information from a sending apparatus to a receiving apparatus, said information transmission method comprising the steps of:
selecting one of a first transmission mode and a second transmission mode,
said sending apparatus demultiplexing an information signal into a first data signal and a second data signal that are different from each other, modulating said first data signal and said second data signal;
controlling said sending apparatus such that said first data signal is transmitted to said receiving apparatus as a radio signal and said second data signal is transmitted to said receiving apparatus as an optical signal when said first transmission mode is selected;
controlling said sending apparatus such that said information signal is transmitted to said receiving apparatus via a plurality of routes including a radio transmission route and an optical transmission route when said second transmission mode is selected;
said receiving apparatus multiplexing said first data signal and said second data signal when said first transmission mode is selected; and
said receiving apparatus diversity-combining said information signal which is transmitted via said plurality of routes when said second transmission mode is selected.

4. The information transmission method as claimed in claim 3, wherein said first transmission mode is selected when transmission routes between said sending apparatus and said receiving apparatus are in a first condition, and said second transmission mode is selected when said transmission routes between said sending apparatus and said receiving apparatus are in a second condition which is worse than said first condition.

5. A sending apparatus comprising:
a mode selection part configured to select one of a first transmission mode and a second transmission mode,
a demultiplexer configured to separate an information signal into a first data signal and a second data signal that are different from each other;
radio signal modulation parts configured to modulate said first data signal and said second data signal;
a control part configured to control said sending apparatus such that said first data signal is transmitted as a radio signal and said second signal is transmitted as an optical signal when said first transmission mode is selected;
said control part controlling said sending apparatus such that said information signal is transmitted via a plurality of routes including a radio transmission route and an optical transmission route when said second transmission mode is selected.

6. The sending apparatus as claimed in claim 5, wherein said mode selection part selects said first transmission mode when transmission routes between said sending apparatus and a receiving apparatus at the other end are in a first condition, and said mode selection part selects said second transmission mode when said transmission routes are in a second condition which is worse than said first condition.

7. A receiving apparatus comprising:
a radio signal receiver configured to receive a radio signal and output a first data signal;
an optical signal receiver configured to receive an optical signal and output a second data signal; and
a signal combining part configured to combine said first data signal and said second data signal, and regenerate an information signal,
said receiving apparatus further comprising:
a mode selection part configured to select one of a first transmission mode and a second transmission mode;
wherein, when said first transmission mode is selected, said first signal and said second signal are different from each other and are multiplexed into an information signal, and, when said second transmission mode is selected, said first signal and said second signal are the same and are diversity-combined by said signal combining part.

8. The receiving apparatus as claimed in claim 7, wherein said mode selection part selects said first transmission mode when transmission routes between said sending apparatus and said receiving apparatus are in a first condition, and said mode selection part selects said second transmission mode when said transmission routes between said sending apparatus and said receiving apparatus are in a second condition which is worse than said first condition.

* * * * *